(12) United States Patent
Nam et al.

(10) Patent No.: US 11,170,488 B2
(45) Date of Patent: Nov. 9, 2021

(54) SIGNAL PROCESSING DEVICE AND IMAGE DISPLAY APPARATUS INCLUDING THE SAME

(71) Applicant: LG ELECTRONICS INC., Seoul (KR)

(72) Inventors: Sangchul Nam, Seoul (KR); Sungmin Kim, Seoul (KR); Myongyoung Lee, Seoul (KR); Yeonoh Nam, Seoul (KR); Seokpan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 16/728,711

(22) Filed: Dec. 27, 2019

(65) Prior Publication Data

US 2020/0211172 A1 Jul. 2, 2020

(30) Foreign Application Priority Data

Dec. 27, 2018 (KR) .................. 10-2018-0170101

(51) Int. Cl.
*G06T 7/00* (2017.01)
*G06T 5/00* (2006.01)
(Continued)

(52) U.S. Cl.
CPC ............ *G06T 7/0002* (2013.01); *G06T 5/002* (2013.01); *G06T 5/003* (2013.01); *G06T 5/40* (2013.01);
(Continued)

(58) Field of Classification Search
CPC ........... G06T 7/002; G06T 7/127; G06T 7/20; G06T 7/33; G06T 7/97; G06T 5/002; G06T 5/003; G06T 5/40; G06T 5/001; G06T 5/10; G06T 5/50; G06T 5/009; G06T 5/007; G06T 2207/30168; G06T 2207/10016; G06T 2207/20076; G06T 2207/20084; G06T 2207/20072; G06T 2207/20004; G06T 2207/20081; G06T 2207/10021;
(Continued)

(56) References Cited

U.S. PATENT DOCUMENTS

| 2008/0100743 A1* | 5/2008 | Cho ..................... G06T 5/007 348/447 |
| 2010/0080459 A1* | 4/2010 | Dai ..................... G06T 5/40 382/170 |

(Continued)

OTHER PUBLICATIONS

PCT International Application No. PCT/KR2019/018604, International Search Report dated Jun. 18, 2020, 3 pages.

*Primary Examiner* — Jose L Couso
(74) *Attorney, Agent, or Firm* — Lee, Hong, Degerman, Kang & Waimey

(57) ABSTRACT

Disclosed is a signal processing device and an image display apparatus including the same. The signal processing device includes: a quality calculator configured to compare a previous frame image and at least a region of a current frame image, and calculate image type information based on a comparison result; an image quality setting unit configured to set an image quality based on the image type information; and an image quality processing unit configured to perform image quality processing according to the set image quality. Accordingly, it is possible to improve accuracy of image analysis and perform image quality processing according thereto.

18 Claims, 19 Drawing Sheets

(51) Int. Cl.
*G06T 5/40* (2006.01)
*H04N 21/44* (2011.01)

(52) U.S. Cl.
CPC ............... *G06T 2207/10016* (2013.01); *G06T 2207/20004* (2013.01); *G06T 2207/20072* (2013.01); *G06T 2207/20076* (2013.01); *G06T 2207/20084* (2013.01); *G06T 2207/30168* (2013.01); *H04N 21/44008* (2013.01)

(58) Field of Classification Search
CPC . G06T 2207/20182; G06T 2207/20008; G06T 3/40; G06T 3/53; H04N 21/44008; H04N 19/137; H04N 19/14; H04N 19/176; H04N 19/184; H04N 19/185; H04N 19/136; H04N 19/154; H04N 19/196; H04N 19/34; H04N 5/145; H04N 5/21; H04N 7/0115; H04N 7/0127; H04N 7/14; H04N 7/0147; H04N 1/00002; H04N 1/00015; H04N 1/00023; H04N 1/00031; H04N 1/00045; H04N 1/00063; G06N 3/08–088; G06N 3/04; G06N 3/0427; G06N 3/0454; G06N 3/0472; G06N 3/0481; G06N 5/022; G06F 16/5866; G06F 16/583; G06F 16/784; G09G 5/005; G09G 3/2022; G09G 3/2059; G09G 2320/0261; G09G 2320/0266; G09G 2320/0276; G09G 2340/16; G06K 9/00268; G06K 9/00684; G06K 9/00718; G06K 9/00744; G06K 9/66; G06K 9/00664; G06K 9/00765; G06K 9/4647; G06K 9/6212; G06K 9/6224; G06K 9/6256; G06K 9/6273; G06K 9/00711; G06K 9/40; G06K 9/3233; G06K 9/6202; G06K 9/6215

See application file for complete search history.

(56) References Cited

U.S. PATENT DOCUMENTS

| | | | |
|---|---|---|---|
| 2011/0019096 A1* | 1/2011 | Lee | H04N 9/646 348/607 |
| 2012/0162290 A1* | 6/2012 | Shiomi | H04N 7/014 345/690 |
| 2012/0281757 A1* | 11/2012 | Roncero Izquierdo | H04N 19/134 375/240.13 |
| 2014/0002730 A1* | 1/2014 | Thomson | G06F 1/3206 348/441 |
| 2016/0021384 A1 | 1/2016 | Croxford et al. | |
| 2016/0247024 A1 | 8/2016 | Loui et al. | |
| 2016/0343113 A1 | 11/2016 | Choudhury et al. | |
| 2017/0295325 A1* | 10/2017 | Yoon | H04N 5/232935 |
| 2018/0267997 A1 | 9/2018 | Lin et al. | |
| 2018/0336454 A1 | 11/2018 | Lim et al. | |
| 2019/0042874 A1* | 2/2019 | Possos | G06N 5/003 |
| 2020/0193924 A1* | 6/2020 | Pai | G02F 1/133602 |

* cited by examiner (a)           (b)           (c)

FIG. 9B

| conv | = | conv | bn | relu | | | |
|---|---|---|---|---|---|---|---|
| conv fc | = | conv dw | bn | relu | conv pw | bn | relu |
| fc | = | fc | bn | relu | | | |

CLASSIFICATION RESSULT

2K Bad $P(x_0) = 0.7$

2K Normal $P(x_1) = 0.2$

4K Bad $P(x_2) = 0.025$

4K Normal $P(x_3) = 0.075$ (a)

(b)

SIGNAL PROCESSING DEVICE AND IMAGE DISPLAY APPARATUS INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2018-0170101, filed on Dec. 27, 2018, the contents of which are hereby incorporated by reference herein in its entirety.

BACKGROUND OF THE INVENTION

1. Field of the Invention

The present invention relates to a signal processing device and an image display apparatus including the same, and more particularly to a signal processing device capable of improving accuracy of image analysis and performing image quality processing therefor and an image display apparatus including the same.

2. Description of the Related Art

A signal processing device is a device that performs signal processing on an input image to display an image.

For example, the signal processing device receives a broadcast signal or an HDMI signal and performs signal processing based on the received broadcast or HDMI signal to output a processed image signal.

Meanwhile, with development of camera and broadcasting technologies, resolution and a vertical synchronization frequency of an input image have improved. Specifically, there are increasing need for image quality processing on an image having 4K resolution and 120 Hz vertical synchronization frequency.

Meanwhile, image quality measurement is critical for image quality processing.

Image quality measurement may be divided into a first method of measuring a relative quality compared to a reference image, and a second method of determining an absolute quality.

The first method is to obtain a relative difference in image quality through measurement, so it is easy to quantify and objectify the image quality.

On the contrary, the second method is to evaluate image quality without any reference, so it is difficult to objectify the image quality and thus the image quality is primarily evaluated subjectively.

Meanwhile, in the case where a broadcast image is received by an image display apparatus through an antenna or the like, a resolution and a compression bit rate of the broadcast image may be figured out through normalization information related to the broadcast image.

However, due to wide spread of IPTVs or cable TVs, a renormalized 2K or 4K image is input to an image display apparatus through an HDMI terminal or the like.

In such a case, information on a resolution and a compression bit rate of the original image may be lost and it is difficult for the image display apparatus to determine a quality of the image which is related to the resolution and the compression bit rate of the original image. As a result, it is difficult to set a quality adequate for the original image and, especially, realize the maximum performance of an image quality algorithm in the image display apparatus.

Meanwhile, when it is necessary to change an image quality setting greatly in response to instant change of resolution or quality of an input image, a user may perceive flicker on the screen.

SUMMARY OF THE INVENTION

An object of the present invention is to provide a signal processing device capable of improving accuracy of image analysis and performing image quality processing therefor, and an image display apparatus including the same.

Another object of the present invention is to provide a signal processing device capable of improving accuracy of calculation of image type information and performing image quality processing therefore, and an image display apparatus including the same.

Yet another object of the present invention is to provide a signal processing device capable of reducing flicker when changing an image quality in response to variation of an original quality of a received image signal, and an image display apparatus including the same.

Yet another object of the present invention is to provide a signal processing device capable of accurately calculating an original quality of a received image signal using a Deep Neural Network (DNN), and an image display apparatus including the same.

Yet another object of the present invention is to provide a signal processing device capable of accurately calculating an original quality of an image signal based on learning by updating a parameter for a DNN from a server, and an image display apparatus including the same.

Yet another object of the present invention is to provide an image display apparatus performing image quality processing appropriate for a resolution and a noise level of a receive image signal.

In order to achieve the above objects, there are provided a signal processing device and an image display apparatus including the same according to an embodiment of the present invention, and the signal processing device includes: a quality calculator configured to compare a previous frame image and at least one region of a current frame image, and calculate image type information based on a comparison result; an image quality setting unit configured to set an image quality based on the image type information; and an image quality processing unit configured to perform image quality processing according to the set image quality.

The quality calculator may be configured to calculate probabilities for a plurality of image types based on the comparison result and output probability information for the plurality of image types, and the image quality setting unit may be configured to set an image quality based on the probability information for the plurality of image types received from the quality calculator.

The image quality setting unit may be configured to determine any one image type based on probability information for a plurality of image types received from the quality calculator, and set an image quality corresponding to the determined image type.

The quality calculator may be configured to extract at least a region of the current frame image, analyze the extracted region through learning, and calculate probabilities for a plurality of image types according to the analysis.

The quality calculator may be configured to analyze the previous frame image and at least a region of the current frame image through learning, and calculate probabilities for a plurality of image types according to the analysis.

The quality calculator may be configured to: when a scene change occurs in the current frame image, output the calculated probabilities for the plurality of image types, and, when no scene change occurs in the current frame image, output a filtered probability using a probability calculated for the previous frame image.

The quality calculator may comprise: a region extractor configured to extract a region of an input image; a probability calculator configured to analyze the extracted region through learning to output probabilities for a plurality of image types; and a probability compensator configured to compensate for the calculated probabilities.

The probability compensator may be configured to output a filtered probability using a probability for the previous frame image and a probability for the current frame image.

The probability compensator may be configured to, when a scene change occurs in the current frame image, output the probabilities calculated by the probability calculator, without performing probability compensation.

The quality calculator may further include: a histogram generator configured to generate a histogram based on the probabilities output from the probability compensator; and a normalizer configured to perform normalization based on an output from the histogram generator.

The image quality setting unit may be configured to output a noise reduction setting value or a sharpness setting value according to the set image quality.

The image type information may include resolution information and image quality information.

The image quality setting unit may be configured to, when an image quality of the previous frame image is a first image quality and an image quality of the current frame image is a second image quality lower than the first image quality, perform image quality setting corresponding not to the second image quality but to the first image quality.

The image quality setting unit may be configured to, when a scene change occurs in the current frame image, perform image quality setting corresponding to the second image quality.

In order to achieve the above objects, there are provided a signal processing device and an image display apparatus including the same according to another embodiment of the present invention, and the signal processing device include: a quality calculator configured to compare a previous frame image and at least one region of a current frame image, and calculate image type information based on a comparison result; an image quality setting unit configured to set an image quality based on the image type information; and an image quality processing unit configured to perform image quality processing according to the set image quality, wherein the image quality setting unit is configured to, when the image type information for the current frame image changes while image quality setting corresponding to a first image quality is performed, keep performing the image quality setting corresponding to the first image quality.

The image quality setting unit may be configured to, when a scene change occurs in the current frame image and the image type information for the current frame image changes, perform the image quality setting corresponding not to the first image quality but to a second image quality.

A signal processing device and an image display apparatus including the same according to an embodiment of the present invention include: a quality calculator configured to compare a previous frame image and at least one region of a current frame image, and calculate image type information based on a comparison result; an image quality setting unit configured to set an image quality based on the image type information; and an image quality processing unit configured to perform image quality processing according to the set image quality. Accordingly, it is possible to improve accuracy of image analysis and perform image quality processing according thereto.

The quality calculator may be configured to calculate probabilities for a plurality of image types based on the comparison result and output probability information for the plurality of image types, and the image quality setting unit may be configured to set an image quality based on the probability information for the plurality of image types received from the quality calculator. Accordingly, it is possible to improve accuracy of calculation of image type information and perform image quality processing according thereto.

The image quality setting unit may be configured to determine any one image type based on probability information for a plurality of image types received from the quality calculator, and set an image quality corresponding to the determined image type. Accordingly, it is possible to improve accuracy of calculation of image type information and perform image quality processing according thereto.

The quality calculator may be configured to extract at least a region of the current frame image, analyze the extracted region through learning, and calculate probabilities for a plurality of image types according to the analysis. Accordingly, it is possible to improve accuracy of calculation of image type information and perform image quality processing according thereto.

The quality calculator may be configured to analyze the previous frame image and at least a region of the current frame image through learning, and calculate probabilities for a plurality of image types according to the analysis. Accordingly, it is possible to improve accuracy of calculation of image type information and perform image quality processing according thereto.

The quality calculator may be configured to: when a scene change occurs in the current frame image, output the calculated probabilities for the plurality of image types, and, when no scene change occurs in the current frame image, output a filtered probability using a probability calculated for the previous frame image. Accordingly, it is possible to perform image quality processing corresponding to the scene change.

The quality calculator may comprise: a region extractor configured to extract a region of an input image; a probability calculator configured to analyze the extracted region through learning to output probabilities for a plurality of image types; and a probability compensator configured to compensate for the calculated probabilities. Accordingly, it is possible to improve accuracy of calculation of image type information and perform image quality processing according thereto.

The probability compensator may be configured to output a filtered probability using a probability for the previous frame image and a probability for the current frame image. Accordingly, despite a change in image quality, it is possible to maintain the image quality intact or vary the image quality smoothly, thereby reducing flicker that can be caused due to a great variation of the image quality.

The probability compensator may be configured to, when a scene change occurs in the current frame image, output the probabilities calculated by the probability calculator, without performing probability compensation. Accordingly, it is possible to perform image quality processing corresponding to the scene change.

The quality calculator may further include: a histogram generator configured to generate a histogram based on the probabilities output from the probability compensator; and a normalizer configured to perform normalization based on an output from the histogram generator. Accordingly, it is possible to improve accuracy of calculation of image type information and perform image quality processing according thereto.

The image quality setting unit may be configured to output a noise reduction setting value or a sharpness setting value according to the set image quality. Accordingly, it is possible to perform image quality processing corresponding to an image type.

The image quality setting unit may be configured to, when an image quality of the previous frame image is a first image quality and an image quality of the current frame image is a second image quality lower than the first image quality, perform image quality setting corresponding not to the second image quality but to the first image quality. Accordingly, despite a change in image quality, it is possible to maintain the image quality intact or vary the image quality smoothly, thereby reducing flicker that can be caused due to a great variation of the image quality.

The image quality setting unit may be configured to, when a scene change occurs in the current frame image, perform image quality setting corresponding to the second image quality. Accordingly, it is possible to perform image quality processing corresponding to the scene change.

A signal processing device and an image display apparatus including the same according to another embodiment of the present invention include: a quality calculator configured to compare a previous frame image and at least one region of a current frame image, and calculate image type information based on a comparison result; an image quality setting unit configured to set an image quality based on the image type information; and an image quality processing unit configured to perform image quality processing according to the set image quality, wherein the image quality setting unit is configured to, when the image type information for the current frame image changes while image quality setting corresponding to a first image quality is performed, keep performing the image quality setting corresponding to the first image quality. Accordingly, despite a change in image quality, it is possible to maintain the image quality intact or vary the image quality smoothly, thereby reducing flicker that can be caused due to a great variation of the image quality.

The image quality setting unit may be configured to, when a scene change occurs in the current frame image and the image type information for the current frame image changes, perform the image quality setting corresponding not to the first image quality but to a second image quality. Accordingly, it is possible to improve accuracy of calculation of image type information and perform image quality processing according thereto.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Hereinafter, the present invention will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
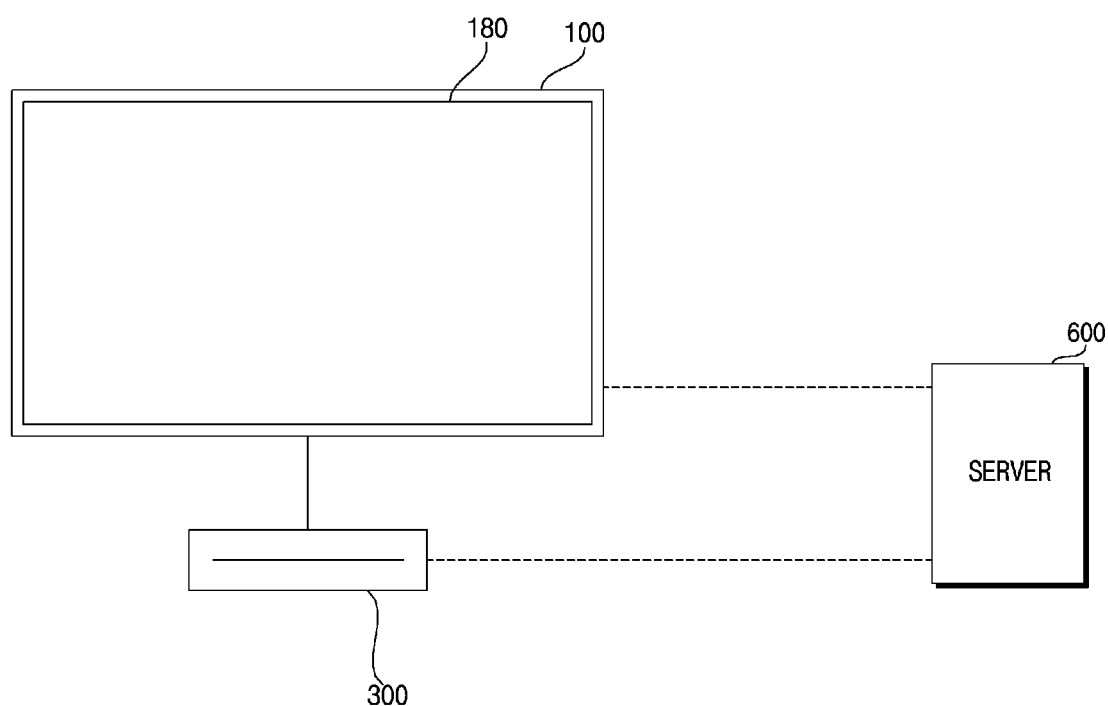
FIG. 1 is a diagram showing an image display system according to an embodiment of the present invention.

FIG. 1 is a diagram showing an image display system according to an embodiment of the present invention.

Referring to the drawing, an image display system 10 according to an embodiment of the present invention may include an image display apparatus 100 including a display 180, a set-top box 300, and a server 600.

The image display apparatus 100 according to an embodiment of the present invention may receive an image from the set-top box 300 or the server 600.

For example, the image display apparatus 100 may receive an image signal from the set-top box 300 through an HDMI terminal.

For another example, the image display apparatus 100 may receive an image signal from the server 600 through a network terminal.

Meanwhile, the image display apparatus 100 may calculate an original quality of an original quality received through an external set-top box 300 or a network, set an image quality of the image signal according to the calculated original quality, and perform image quality processing on the image signal according to the set image quality.

Meanwhile, the image display apparatus 100 according to an embodiment of the present invention includes an image quality processing unit 635 configured to compare a previous frame image and at least one region of a current frame image, calculate image type information based on a result of the comparison, set an image quality based on the image type information, and perform image quality processing according to the set image quality. Accordingly, it is possible to improve accuracy of image analysis and perform image quality processing according thereto.

In particular, the image display apparatus 100 may calculate probabilities for a plurality of image types based on a result of the comparison, output probability information, and set an image quality based on the probability information for the plurality of image types calculated by a quality calculator 632. Accordingly, it is possible to improve accuracy of calculation of image type information and perform image quality processing according thereto.

Meanwhile, the image display apparatus 100 may output a filtered probability based on a probability for a previous frame image and a probability for a current frame image. Accordingly, despite a change in image quality, it is possible to maintain the image quality intact or vary the image quality smoothly, thereby reducing flicker that can be caused due to a great variation of the image quality.

Meanwhile, if a scene change occurs in the current frame image, the image display apparatus 100 may output a probability calculated by the probability calculator 1220, without performing probability compensation. Accordingly, it is possible to perform image quality processing in response to the scene change.

Meanwhile, the image display apparatus 100 according to another embodiment of the present invention may compare a previous frame image and at least one region of a current frame image, calculate image type information based on a result of the comparison, set an image quality based on the information for the image type, and, if the image type information for the current frame image changes while image quality setting to a first image quality is performed, keep performing the image quality setting corresponding to the first image quality. Accordingly, it is possible to improve accuracy of calculation of image type information and perform image quality processing according thereto. In particular, despite a change in the image quality, it is possible to maintain the image quality intact or vary the image quality smoothly, thereby reducing flicker that can be caused due to a great variation of the image quality.

Meanwhile, the image display apparatus 100 may calculate a resolution, a noise level, and the like of a received image signal using a Depp Neural Network (DNN). Accordingly, it is possible to accurately calculate a original quality of the received image signal.

Meanwhile, the image display apparatus 100 may update a parameter for the DNN from the server 600, and calculate a resolution and a noise level of the received image signal based on the updated parameter. Accordingly, it is possible to accurately calculate an original quality of the received image signal based on learning.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present invention, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processing unit 170 (see FIG. 2) of the image display apparatus 100 performs image quality processing for the OLED panel. Meanwhile, the signal processing unit may be called a signal processing device.

Meanwhile, the image display apparatus 100 in FIG. 1 may be a TV, a monitor, a tablet PC, a mobile terminal, a display for a vehicle, etc.

Figure 2:
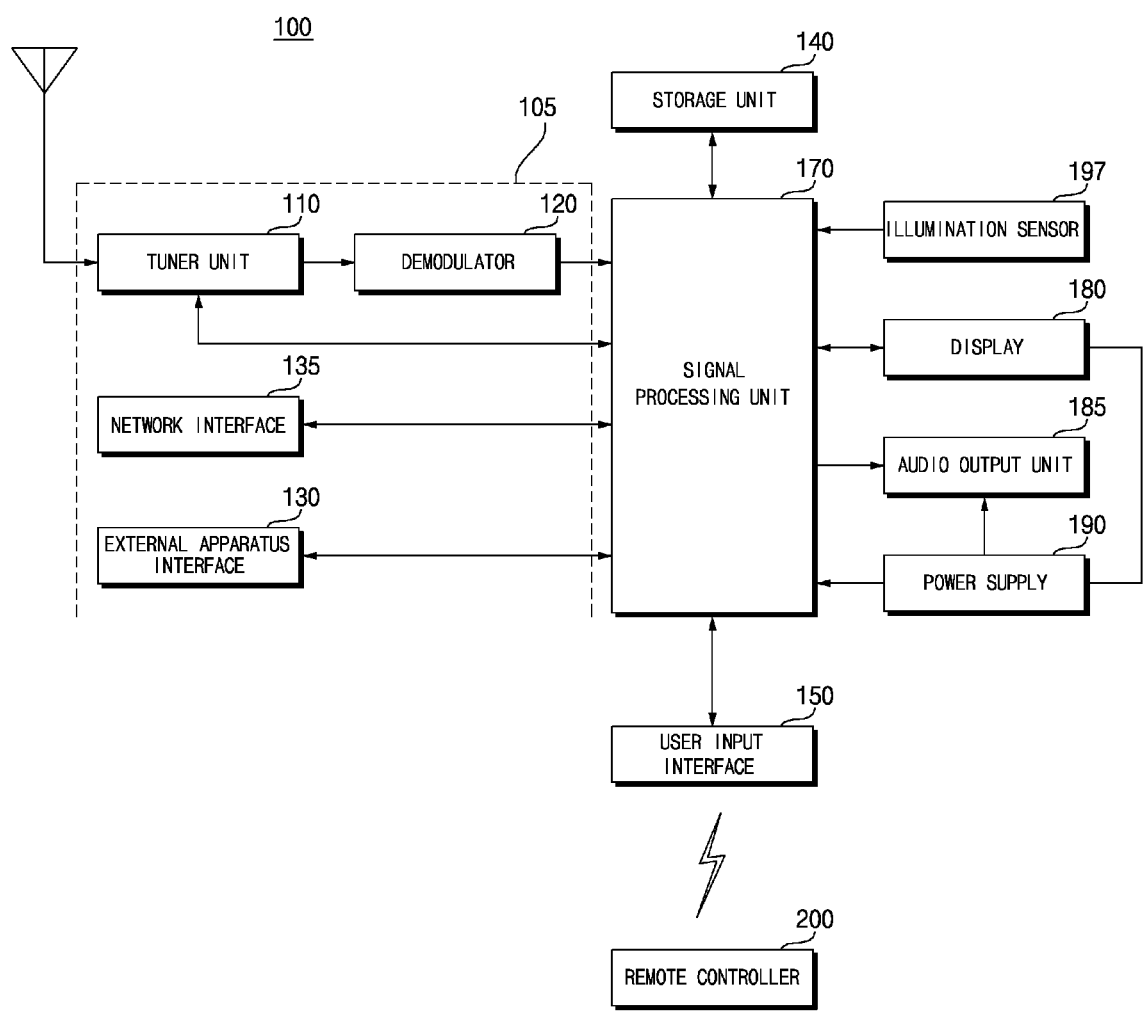
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present invention includes an image receiving unit 105, a storage unit 140, a user input interface 150, a sensor unit (not shown), a signal processing unit 170, a display 180, and an audio output unit 185.

The image receiving unit 105 may include a tuner unit 110, a demodulator 120, a network interface 135, and an external apparatus interface 130.

Meanwhile, unlike the drawing, the image receiving unit 105 may include only the tuner unit 110, the demodulator 120, and the external apparatus interface 130. That is, the network interface 135 may not be included.

The tuner unit 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner unit 110 can process a digital broadcast signal or an analog broadcast signal. The analog baseband image or audio signal (CVBS/SIF) output from the tuner unit 110 may be directly input to the signal processing unit 170.

Meanwhile, the tuner unit 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner unit 110 and performs a demodulation operation.

The demodulator 120 may perform demodulation and channel decoding and then output a stream signal TS. At this time, the stream signal may be a demultiplexed signal of an image signal, a audio signal, or a data signal.

The stream signal output from the demodulator 120 may be input to the signal processing unit 170. The signal processing unit 170 performs demultiplexing, image/audio signal processing, and the like, and then outputs an image to the display 180 and outputs audio to the audio output unit 185.

The external apparatus interface 130 may transmit or receive data with a connected external apparatus (not shown), e.g., a set-top box 50. To this end, the external apparatus interface 130 may include an A/V input and output unit (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output unit may receive image and audio signals from an external apparatus. Meanwhile, a wireless communication unit (not shown) may perform short-range wireless communication with other electronic apparatus.

Through the wireless communication unit (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communication unit (not shown).

The storage unit 140 may store a program for each signal processing and control in the signal processing unit 170, and may store a signal-processed image, audio, or data signal.

In addition, the storage unit 140 may serve to temporarily store image, audio, or data signal input to the external apparatus interface 130. In addition, the storage unit 140 may store information on a certain broadcast channel through a channel memory function such as a channel map.

Although FIG. 2 illustrates that the storage unit is provided separately from the signal processing unit 170, the scope of the present invention is not limited thereto. The storage unit 140 may be included in the signal processing unit 170.

The user input interface 150 transmits a signal input by the user to the signal processing unit 170 or transmits a signal from the signal processing unit 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing unit 170, may transfer a user input signal input from a sensor unit (not shown) that senses a user's gesture to the signal processing unit 170, or may transmit a signal from the signal processing unit 170 to the sensor unit (not shown).

The signal processing unit 170 may demultiplex the input stream through the tuner unit 110, the demodulator 120, the network interface 135, or the external apparatus interface 130, or process the demultiplexed signals to generate and output a signal for image or audio output.

For example, the signal processing unit 170 receives a broadcast signal received by the image receiving unit 105 or an HDMI signal, and perform signal processing based on the received broadcast signal or the HDMI signal to thereby output a signal-processed image signal.

The image signal processed by the signal processing unit 170 is input to the display 180, and may be displayed as an image corresponding to the image signal. In addition, the image signal processed by the signal processing unit 170 may be input to the external output apparatus through the external apparatus interface 130.

The audio signal processed by the signal processing unit 170 may be output to the audio output unit 185 as an audio signal. In addition, audio signal processed by the signal processing unit 170 may be input to the external output apparatus through the external apparatus interface 130.

Although not shown in FIG. 2, the signal processing unit 170 may include a demultiplexer, an image processor, and the like. That is, the signal processing unit 170 may perform a variety of signal processing and thus it may be implemented in the form of a system on chip (SOC). This will be described later with reference to FIG. 3.

In addition, the signal processing unit 170 can control the overall operation of the image display apparatus 100. For example, the signal processing unit 170 may control the tuner unit 110 to control the tuning of the RF broadcast corresponding to the channel selected by the user or the previously stored channel.

In addition, the signal processing unit 170 may control the image display apparatus 100 according to a user command input through the user input interface 150 or an internal program.

Meanwhile, the signal processing unit 170 may control the display 180 to display an image. At this time, the image displayed on the display 180 may be a still image or a moving image, and may be a 2D image or a 3D image.

Meanwhile, the signal processing unit 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing unit 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processing unit 170, an image signal, a data signal, a control signal, and the like received from the external apparatus interface 130.

Meanwhile, the display 180 may be configured as a touch screen and used as an input device in addition to an output device.

The audio output unit 185 receives a signal processed by the signal processing unit 170 and outputs it as an audio.

The photographing unit (not shown) photographs a user. The photographing unit (not shown) may be implemented by a single camera, but the present invention is not limited thereto and may be implemented by a plurality of cameras. Image information photographed by the photographing unit (not shown) may be input to the signal processing unit 170.

The signal processing unit 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output unit 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
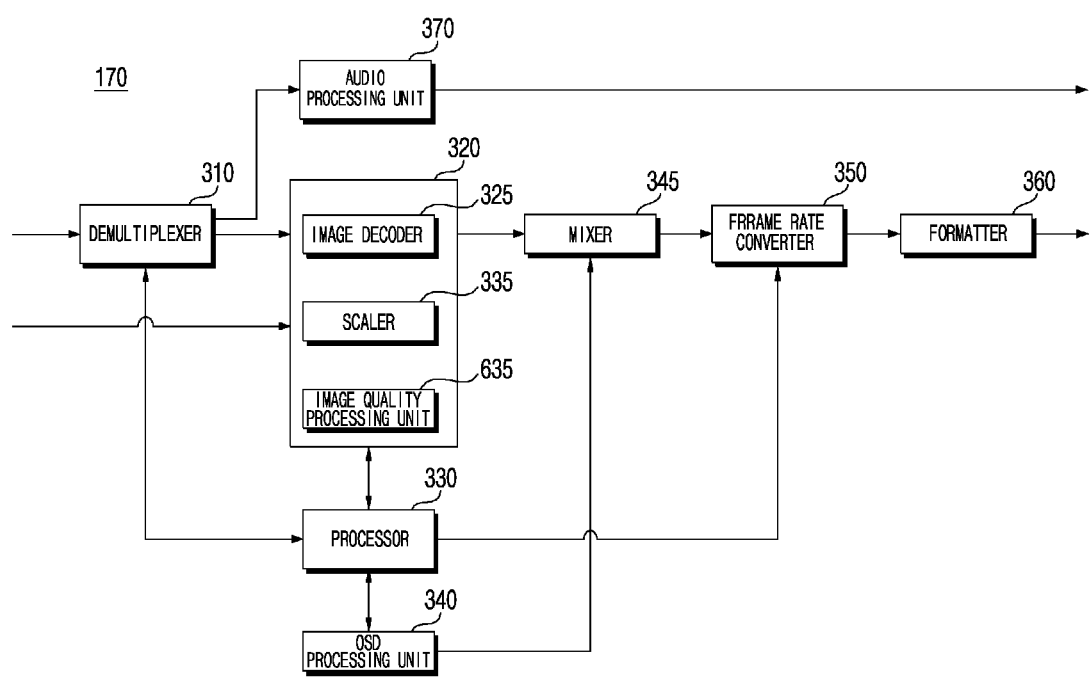
FIG. 3 is an example of an internal block diagram of the signal processing unit in FIG. 2.

FIG. 3 is an example of an internal block diagram of the signal processing unit in FIG. 2.

Referring to the drawing, the signal processing unit 170 according to an embodiment of the present invention may include a demultiplexer 310, an image processing unit 320, a processor 330, and an audio processing unit 370. In addition, the signal processing unit 170 may further include and a data processing unit (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner unit 110, the demodulator 120, or the external apparatus interface 130.

The image processing unit 320 may perform signal processing on an input image. For example, the image processing unit 320 may perform image processing on an image signal demultiplexed by the demultiplexer 310.

To this end, the image processing unit 320 may include an image decoder 325, a scaler 335, an image quality processing unit 635, an image encoder (not shown), an OSD processing unit 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processing unit 635 may perform image quality processing on an input image signal decoded by the image decoder 325 or the like.

For example, the image quality processing unit 625 may perform noise reduction processing on an input image signal, extend a resolution of high gray level of the input image signal, perform image resolution enhancement, perform high dynamic range (HDR)-based signal processing, change a frame rate, perform image quality processing appropriate for properties of a panel, especially an OLED panel, etc.

The OSD processing unit 340 generates an OSD signal according to a user input or by itself. For example, based on a user input signal, the OSD processing unit 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processing unit 340 may generate a pointer that can be displayed on the display, based on a pointing signal input from the remote controller 200. In particular, such a pointer may be generated by a pointing signal processing unit, and the OSD processing unit 340 may include such a pointing signal processing unit (not shown). Obviously, the pointing signal processing unit (not shown) may be provided separately from the OSD processing unit 340.

The mixer 345 may mix an OSD signal generated by the OSD processing unit 340 with a decoded image signal image-processed by the image processing unit 320. The mixed image signal is supplied to the frame rate converter 350.

Meanwhile, the formatter 360 may change a format of a received image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing unit 170.

For example, the processor 330 may control the tuner unit 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface unit 135 or to the external apparatus interface 130.

In addition, the processor 330 may control the demultiplexer 310, the image processing unit 320, and the like in the signal processing unit 170.

Meanwhile, the audio processing unit 370 in the signal processing unit 170 may perform the audio processing of the demultiplexed audio signal. To this end, the audio processing unit 370 may include various decoders.

In addition, the audio processing unit 370 in the signal processing unit 170 may process a base, a treble, a volume control, and the like.

The data processing unit (not shown) in the signal processing unit 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processing unit 170 shown in FIG. 3 is a block diagram for an embodiment of the present invention. Each component of the block diagram may be integrated, added, or omitted according to a specification of the signal processing unit 170 actually implemented.

In particular, the frame rate converter 350 and the formatter 360 may be provided separately in addition to the image processing unit 320.

Figure 4A:
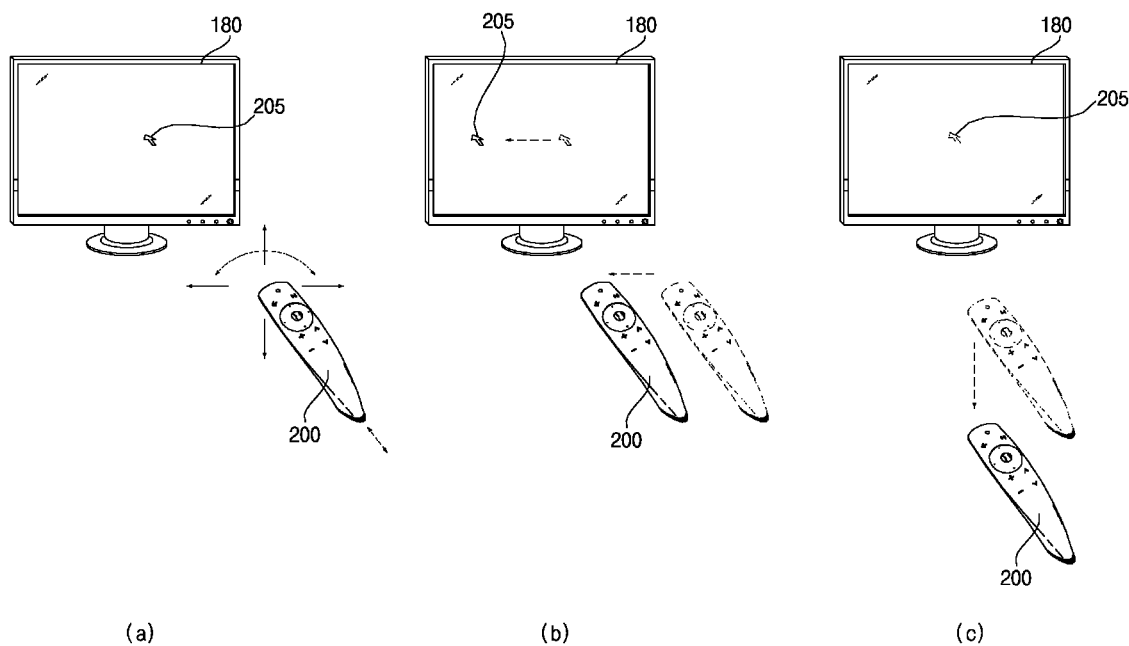
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
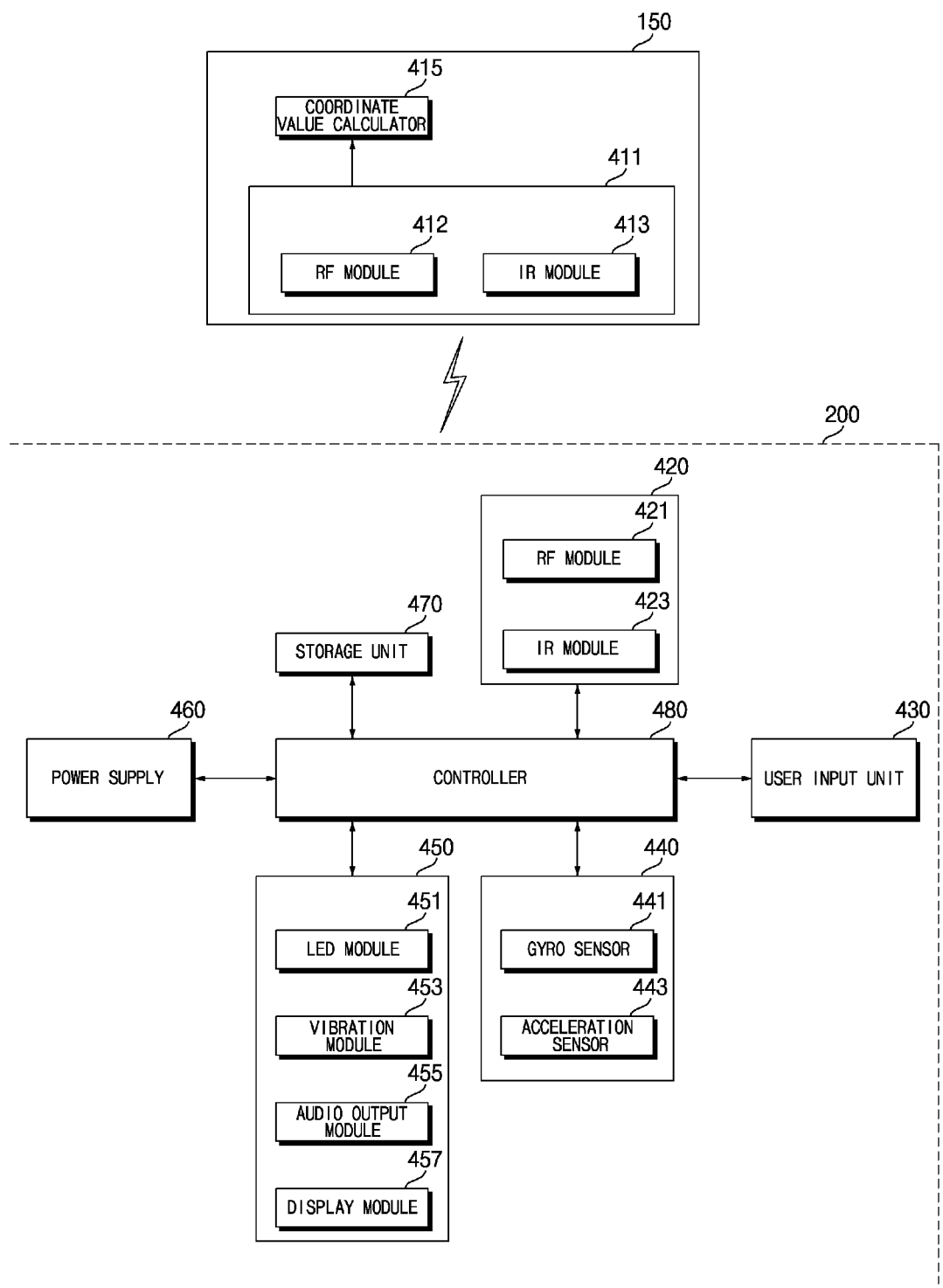
FIG. 4B is an internal block diagram of the remote controller of FIG. 2.

FIG. 4B is an internal block diagram of the remote controller of FIG. 2.

Referring to the drawing, the remote controller 200 includes a wireless communication unit 425, a user input unit 435, a sensor unit 440, an output unit 450, a power supply 460, a storage unit 470, and a controller 480.

The wireless communication unit 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user can input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means such as a scroll key, a jog key, etc., which can be operated by the user, and the present invention does not limit the scope of the present invention.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communication unit 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The storage unit 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the storage unit 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communication unit 425.

The user input interface 150 of the image display apparatus 100 includes a wireless communication unit 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communication unit 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processing unit 170, not in the user input interface 150.

Figure 5:
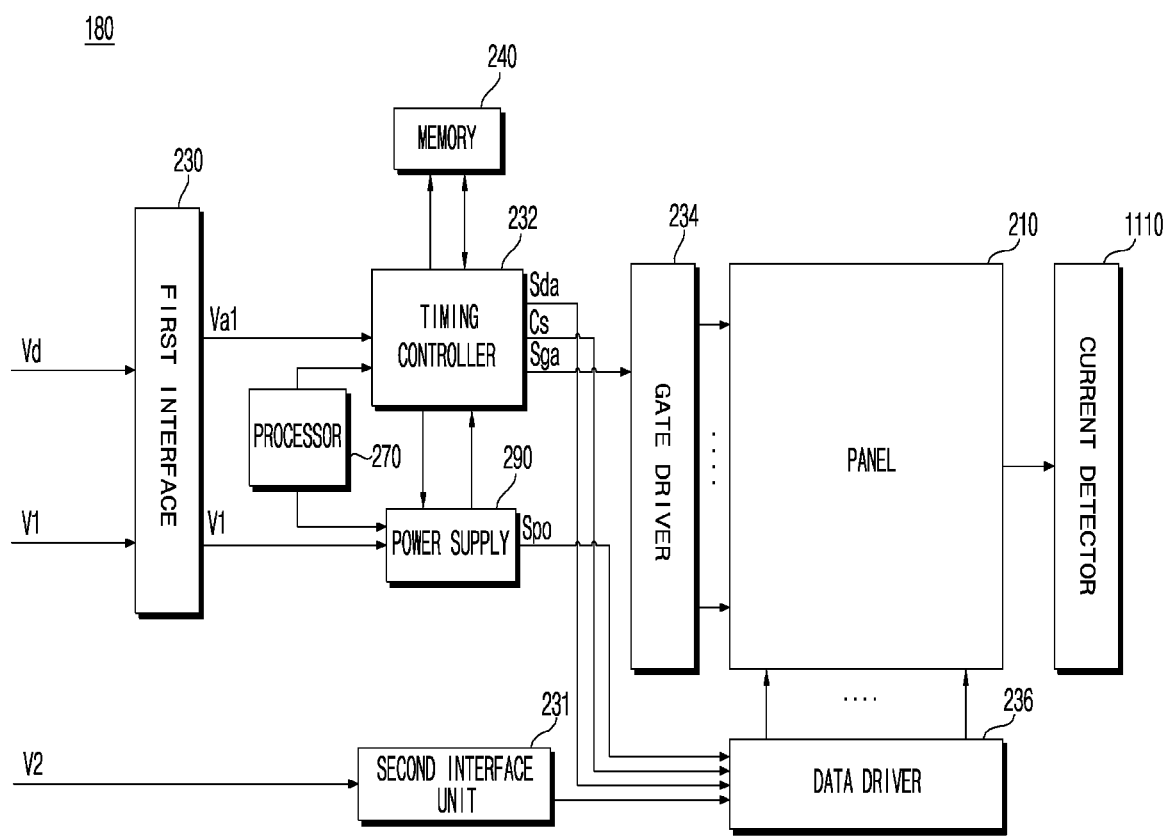
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processing unit 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processing unit 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
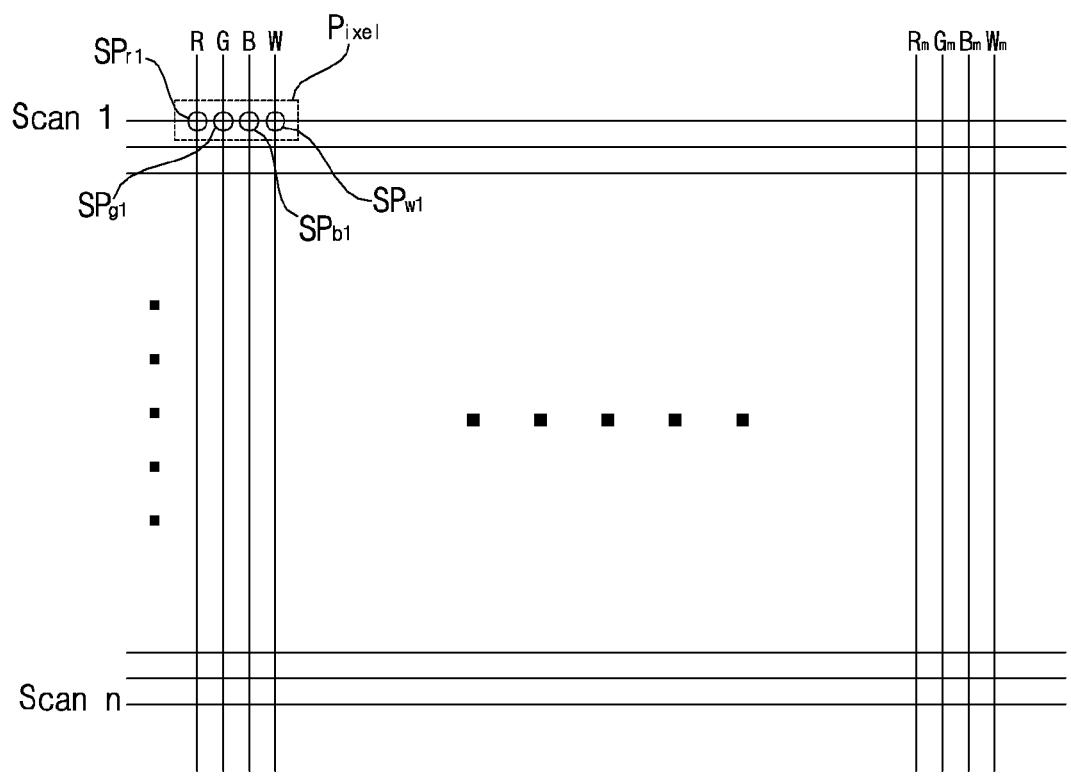
FIG. 6A and FIG. 6B are diagrams referred to in the description of an organic light emitting diode panel of FIG. 5.
Figure 6B:
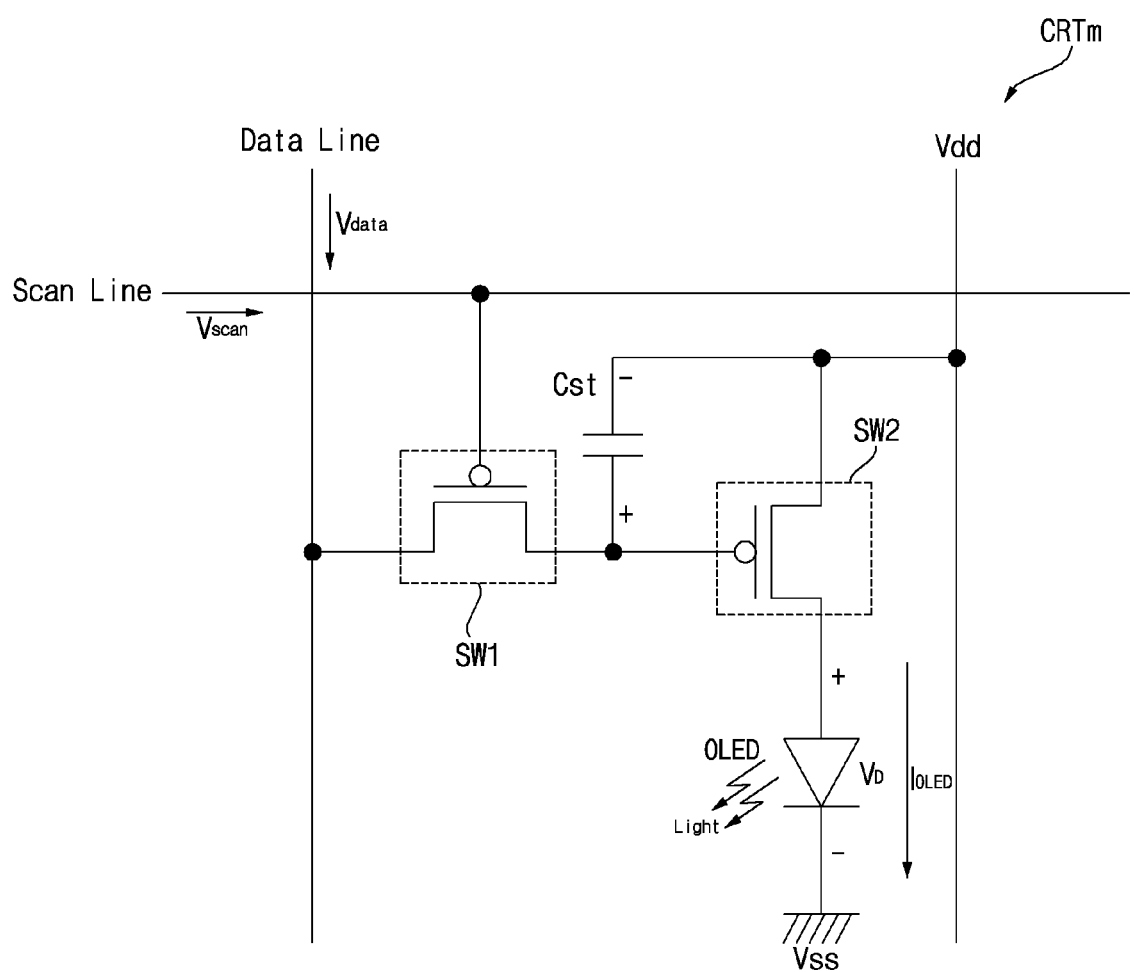

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pluse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required. Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
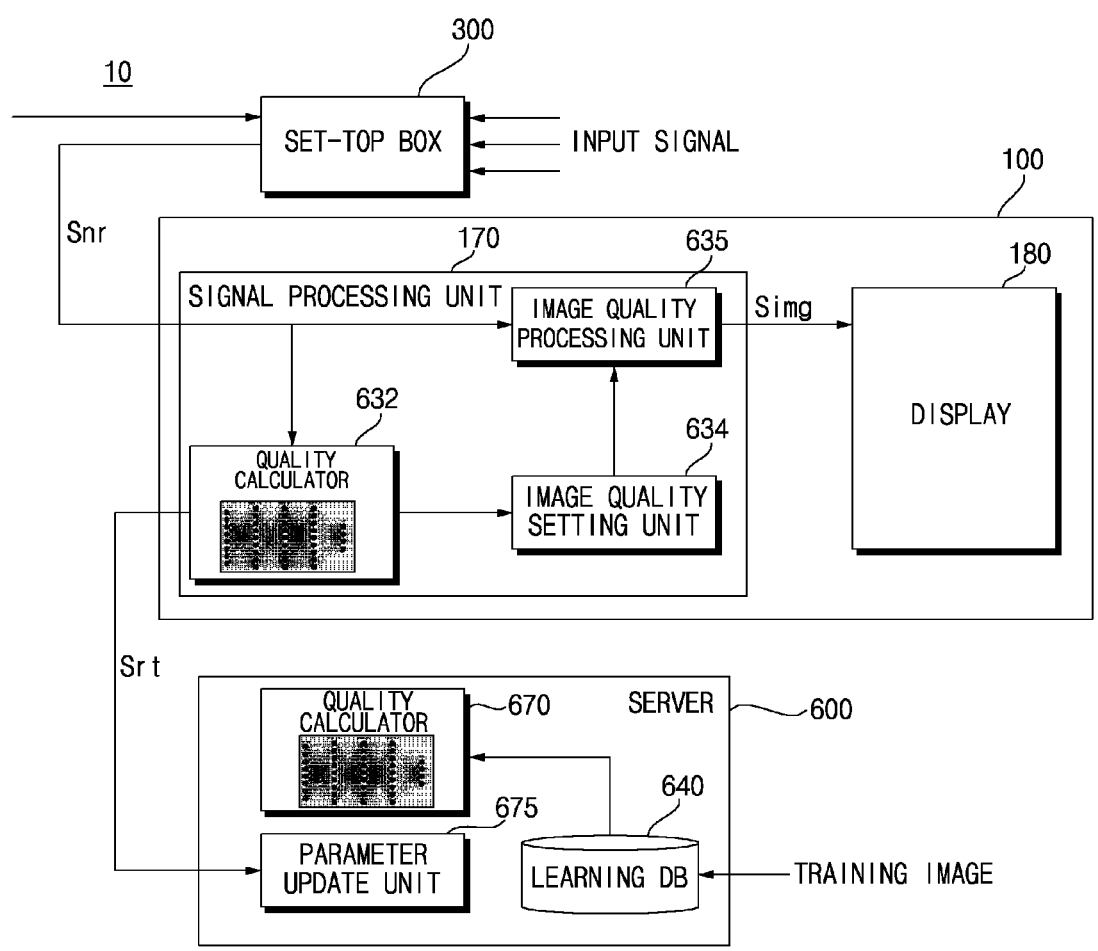
FIG. 7 is an example of an internal block diagram of a signal processing device according to an embodiment of the present invention.
Figure 8:
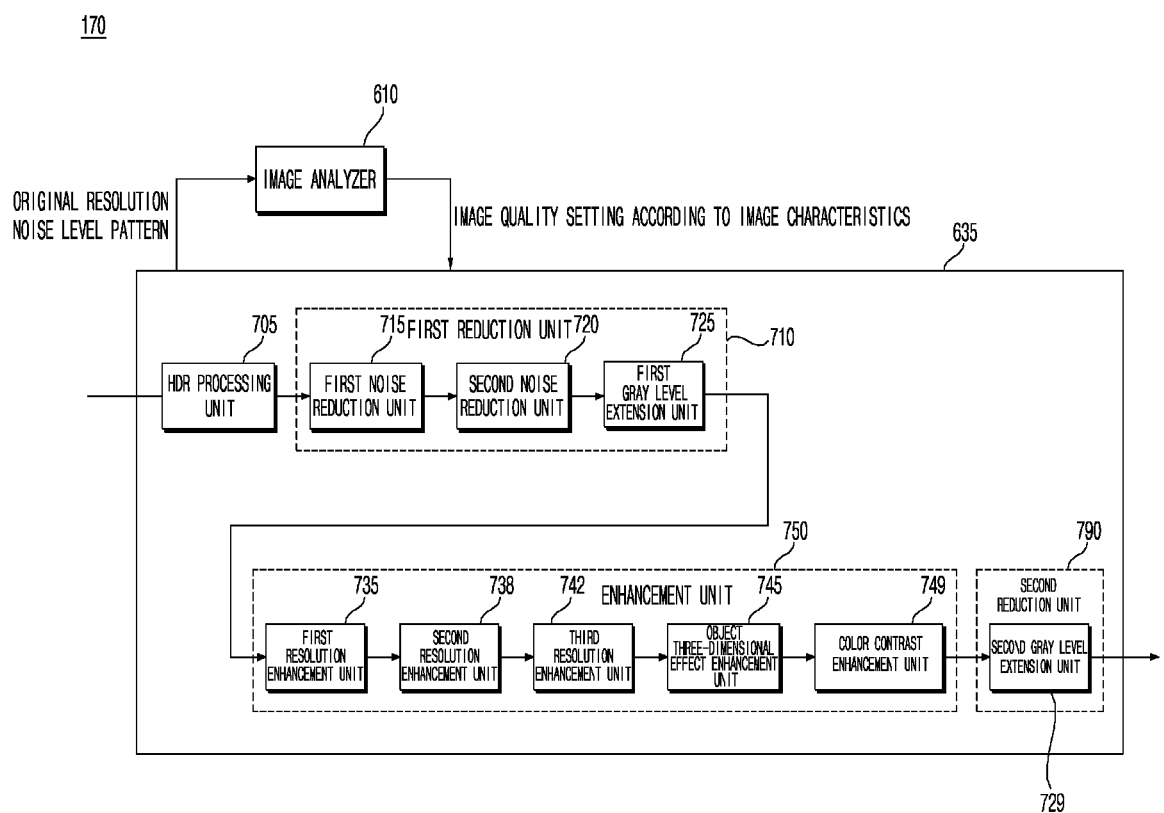
FIGS. 8 to 9B are diagrams referred to in the description of the signal processing device shown in FIG. 7.

FIG. 7 is an example of an internal block diagram of a signal processing device according to an embodiment of the present invention, and FIGS. 8 to 9B are diagrams referred to in the description of the signal processing device shown in FIG. 7.

First, referring to FIG. 7, an image display system 10 according to an embodiment of the present invention may include an image display apparatus 100, a server 600, and a set-top box 300.

The server 600 may include a learning DB 640 configured to receive a training image and store the received training image; a quality calculator 670 configured to calculate an image source quality using the training image from the learning DB 6400 and a Deep Neural Network (DNN); and an parameter update unit 675 configured to update a parameter for the DNN based on the learning DB 640 and the quality calculator 670.

The parameter update unit 675 may transmit the updated parameter to a quality calculator 632 of the image display apparatus 100.

The set-top box 300 may receive an input signal from an image provider, and transmit the image signal to an HDMI terminal of the image display apparatus 100.

The image display 100 may include: an image receiver 105 configured to receive an image signal via an external set-top box 300 or a network; a signal processing unit 170 configured to perform signal processing on the image signal received by the image receiving unit 105; and a display 180 configured to display an image processed by the signal processing unit 170.

Meanwhile, the image display apparatus 100 may apply an optimal tuning for the quality of an input image.

Meanwhile, the image display apparatus 100 may analyze an input image in real time to determine an original resolution, a noise level, a compression level, and an enhancement level of the input image.

Meanwhile, the image display apparatus 100 may change an image quality setting based on calculated image information data without causing a sense of discomfort or distortion.

Meanwhile, the signal processing unit 170 may include: the quality calculator 632 configured to calculate original quality of an image signal received via the external set-top box 300 or a network; an image quality setting unit 634 configured to set the quality of the image signal; and an image quality processing unit 635 configured to perform image quality processing on the image signal according to the set quality.

If original quality of a received image signal is changed at a first point in time, the image quality setting unit 634 changes an image quality setting from a first setting to a second setting in a sequence and the image quality processing unit 635 may perform image quality processing according to the sequential change of the first setting to the second setting. Accordingly, it is possible to reduce flicker when the image quality is changed due to the change of the original quality of the received image signal. In particular, when the original quality of the image signal is changed, the quality may be changed smoothly rather than radically.

Meanwhile, if original quality of a received image signal is modified at a first point in time while an image is reproduced, the image quality setting unit 634 may sequentially change an image quality setting from a first setting to a second setting. Accordingly, when changing the original quality of the received image signal, it is possible to change the image quality setting in real time. In particular, when the original quality of the image signal is changed, the image quality may be changed smoothly rather than radically.

Meanwhile, if original quality of a received image signal is changed at a first point in time due to a channel change or an input change while the image signal is received from the set-top box 300, the image quality setting unit 634 change the image quality from a first setting to a second setting in a sequence. Accordingly, it is possible to reduce flicker when the image quality is changed due to the original quality of the received image signal is changed. In particular, when the original quality of the image signal is changed, the image quality may be changed smoothly rather than radically.

The quality calculator 632 may classify an input image as an UHD (3840×2160 or more), HD (1280×720), or SD (720×480 or more) image.

The quality calculator 632 may calculate a probability for each resolution with respect to an input image, select a resolution having the highest probability as the final resolution and exclude a resolution having a too low probability.

The quality calculator 632 may anticipate a noise level and a compression level in addition to the resolution.

Meanwhile, when calculating the compression level, the quality calculator 632 may determine the compression level based on training data obtained by reducing a compression bit-rate with reference to an original state.

For example, for FHD, the quality calculator 632 may evaluate the current digital TV broadcasting standard as 1.0 and calculate such that the value can be reduced to 0.0 when data be lost as compressed too much.

Meanwhile, the quality calculator 632 may calculate a noise level by measuring a level of flicker in an input image.

For example, the quality calculator 632 may calculate a level of noise in an input image into one of four levels that are high level, medium level, low level, and no-noise level.

Meanwhile, the quality calculator 632 may calculate a resolution and a noise level of a received image signal using a DNN. Accordingly, it is possible to accurately calculate original quality of the received image.

Meanwhile, the quality calculator 632 may update a parameter for the DNN from the server 600, and calculate a resolution and a noise level of a received image signal based on the updated parameter. Accordingly, it is possible to accurately calculate original quality of an image signal based on learning.

Meanwhile, the quality calculator 632 may extract a first region and a second region from the image signal, and calculate an original resolution of the image signal based on the first region and a noise level of the image signal based on the second region. Accordingly, it is possible to accurately calculate the original quality of the image signal based on extraction of a region suitable for the quality calculation.

Meanwhile, the quality calculator 632 may extract a region having the most edge components in the image signal as a first region, and extract a region having the least edge components in the image signal as a second region. Accordingly, it is possible to accurately calculate the original quality of the image signal based on extraction of a region suitable for the quality calculation.

Meanwhile, the image quality processing unit 635 may increase the noise reduction processing intensity for an image signal as the calculated noise level increases. Accordingly, it is possible to perform image quality processing appropriate for a noise level of a received image signal.

Meanwhile, the quality calculator 632 may calculate an original resolution, a noise level, and a compression level of a received image signal, and calculate the compression level based on training data obtained by reducing a compression bit rate.

Meanwhile, the image quality processing unit 635 may decrease the enhancement intensity for the image signal as the higher the calculated compression level increases. Accordingly, it is possible to accurately calculate the compression level.

Meanwhile, the image quality processing unit 635 may increase the enhancement intensity for the image signal as the original resolution of the image signal increases. Accordingly, it is possible to perform image quality processing appropriate for the original resolution of the received image signal.

Meanwhile, the image quality processing unit 635 may increase the blurring processing intensity for the image signal as the calculated compression level increases. Accordingly, it is possible to perform image quality processing appropriate for a compression level of a received image signal.

Meanwhile, the image quality processing unit 635 may decrease the filter used to filter the image signal as the original resolution of the image signal increases. Accordingly, it is possible to perform image quality processing appropriate for the original resolution of the received image signal.

Meanwhile, the image quality processing unit 635 may downscale an image signal according to an original resolution of an image signal, perform image quality processing on the downscaled image signal, upscales the image-quality-processed image signal, and output the upscaled image signal. Accordingly, it is possible to perform image quality processing appropriate for the original resolution of the received image signal.

FIG. 8 is an example of an internal block diagram of the signal processing device 170 in FIG. 7.

Meanwhile, the signal processing device 170 in FIG. 8 may correspond to the signal processing unit 170 in FIG. 2.

First, referring to FIG. 8, the signal processing device 170 according to an embodiment of the present invention may include an image analyzer 610 and an image quality processing unit 635.

The image analyzer 610 may include the quality calculator 632 shown in FIG. 7 and an image quality setting unit 634.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiving unit 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processing unit 635.

The image quality processing unit 635 may include an HDR processing unit 705, a first reduction unit 710, an enhancement unit 750, and a second reduction unit 790.

The HDR processing unit 705 may receive an image signal and perform high dynamic range (HDR) processing on the input image signal.

For example, the HDR processing unit 705 may convert a standard dynamic range (SDR) image signal into an HDR image signal.

For another example, the HDR processing unit 705 may receive an image signal, and perform gray level processing on the input image signal for an HDR.

Meanwhile, if an input image signal is an SDR image signal, the HDR processing unit 705 may bypass gray level conversion, and, if an input image signal is an HDR image signal, the HDR processing unit 705 perform gray level conversion. Accordingly, it is possible to improve high gray level expression for an input image.

Meanwhile, the HDR processing unit 705 may perform gray level conversion processing based on a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processing unit 705 may perform gray level conversion processing based on data corresponding to the first gray level conversion mode in a lookup table.

More specifically, if the first gray level conversion mode is implemented, the HDR processing unit 705 may perform gray level conversion processing based on an equation for input data and the first gray level conversion mode in a lookup table determined by the equation. Here, the input data may include video data and metadata.

Meanwhile, if the second gray level conversion mode is implemented, the HDR processing unit 705 may perform gray level conversion processing based on data corresponding to the second gray level conversion mode in a lookup table.

More specifically, if the second gray level conversion mode is implemented, the HDR processing unit 705 may perform gray level conversion processing based on an equation for input data and data corresponding to the second gray level conversion mode in a lookup table determined by the equation. Here, the input data may include video data and metadata.

Meanwhile, the HDR processing unit 705 may select the first gray level conversion mode or the second gray level conversion mode according to a third gray level conversion mode or a fourth gray level conversion mode in a high gray level amplifying unit 851 in the second reduction unit 790.

For example, if the third gray level conversion mode is implemented, the high gray level amplifying unit 851 in the second reduction unit 790 may perform gray level conversion processing based on data corresponding to the third gray level conversion mode in a lookup table.

Specifically, if the third gray level conversion mode is implemented, the high gray level amplifying unit 851 in the second reduction unit 790 may perform gray level conversion processing based on an equation for input data and data corresponding to the third gray level conversion mode in a lookup table determined by the equation. Here, the input data may include video data and metadata.

Meanwhile, if the fourth type gray level conversion is implemented, the high gray level amplifying unit 851 in the second reduction unit 790 may perform gray level conversion processing based on data corresponding to the fourth gray level conversion mode in a lookup table.

Specifically, if the fourth gray level conversion mode is implemented, the high gray level amplifying unit 851 in the second reduction unit 790 may perform gray level conversion processing based on an equation for input data and data corresponding to the fourth gray level conversion mode in a lookup table determined by the equation. Here, the input data may include video data and metadata.

For example, if the fourth gray level conversion mode is implemented in the high gray level amplifying unit 851 in the second reduction unit 790, the HDR processing unit 705 may implement the second gray level conversion mode.

For another example, if the third gray level conversion mode is implemented in the high gray level amplifying unit 851 in the second reduction unit 790, the HDR processing unit 705 may implement the first gray level conversion mode.

Alternatively, the high gray level amplifying unit 851 in the second reduction unit 790 may change a gray level conversion mode according to a gray level conversion mode in the HDR processing unit 705.

For example, if the second gray level conversion mode is implemented in the HDR processing unit 705, the high gray level amplifying unit 851 in the second reduction unit 790 may perform the fourth gray level conversion mode.

For another example, if the first gray level conversion mode is implemented in the HDR processing unit 705, the high gray level amplifying unit 851 in the second reduction unit 790 may implement the third gray level conversion mode.

Meanwhile, the HDR processing unit 705 according to an embodiment of the present invention may implement a gray level conversion mode so that low gray level and high gray level are converted uniformly.

Meanwhile, according to the second gray level conversion mode in the HDR processing unit 705, the second reduction unit 790 may implement the fourth gray level conversion mode and thereby amplify an upper limit on gray level of a received input signal. Accordingly, it is possible to improve high gray level expression for the input image.

Next, the first reduction unit 710 may perform noise reduction on an input image signal or an image signal processed by the HDR processing unit 705.

Specifically, the first reduction unit 710 may perform a plurality of stages of noise reduction processing and a first stage of gray level extension processing on an input image signal or an HDR image from the HDR processing unit 705.

To this end, the first reduction unit 710 may include a plurality of noise reduction parts 715 and 720 for reducing noise in a plurality of stages, and a first gray level extension unit 725 for extending gray level.

Next, the enhancement unit 750 may perform a plurality of stages of image resolution enhancement processing on an image from the first reduction unit 710.

In addition, the enhancement unit 750 may perform object three-dimensional effect enhancement processing. In addition, the enhancement unit 750 may perform color or contrast enhancement processing.

To this end, the enhancement unit 750 may include: a plurality of resolution enhancement units 735, 738, 742 for enhancing a resolution of an image in a plurality of stages; an object three-dimensional effect enhancement unit 745 for enhancing a three-dimensional effect of an object; and a color contrast enhancement unit 749 for enhancing color or contrast.

Next, the second reduction unit 790 may perform a second stage of gray level extension processing based on a noise-reduced image signal received from the first reduction unit 710.

Meanwhile, the second reduction unit 790 may amplify an upper limit on gray level of a input signal, and extend a resolution of high gray level of the input signal. Accordingly, it is possible to improve high gray level expression for an input image.

For example, gray level extension may be performed uniformly on the entire gray level range of a input signal. Accordingly, gray level extension is performed uniformly on the entire area of an input image, thereby improving high gray level expression.

Meanwhile, the second reduction unit 790 may perform gray level amplification and extension based on a signal received from the first gray level extension unit 725. Accordingly, it is possible to improve high gray level expression for an input image.

Meanwhile, if an input image signal input is an SDR image signal, the second reduction unit 790 may vary the degree of amplification based on a user input signal. Accordingly, it is possible to improve high gray level expression in response to a user setting.

Meanwhile, if an input image signal is an HDR image signal, the second reduction unit 790 may perform amplification according to a set value. Accordingly, it is possible to improve high gray level expression for an input image.

Meanwhile, if an input image signal is an HDR image signal, the second reduction unit 790 may vary the degree of amplification based on a user input signal. Accordingly, it is possible to improve high gray level expression according to a user setting.

Meanwhile, in the case of extending gray level based on a user input signal, the second reduction unit 790 may vary the degree of extension of gray level. Accordingly, it is possible to improve high gray level expression according to a user's setting.

Meanwhile, the second reduction unit 790 may amplify an upper limit on gray level according to a gray level conversion mode in the HDR processing unit 705. Accordingly, it is possible to improve high gray level expression for an input image.

The signal processing device 170 includes the HDR processing unit 705 configured to receive an image signal and adjust luminance of the input image signal, and the reduction unit 790 configured to amplify brightness of the image signal received from the HDR processing unit 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reduction unit 790 may include the high gray level amplifying unit 851 configured to amplify an upper limit on gray level of a input signal, and a decontouring unit 842 and 844 configured to extend the resolution of gray level amplified by the high gray level amplifying unit 851.

The second reduction unit 790 may include a second gray level extension unit 729 for a second stage of gray level extension.

Meanwhile, the image quality processing unit 635 in the signal processing device 170 according to the present invention is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reduction unit 710, and the two stages of gray level extension processing may be performed by the first gray level extension unit 725 in the first reduction unit 710 and the second gray level extension unit 729 in the second reduction unit 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancement units 735, 738, and 742, and the object three-dimensional effect enhancement may be performed by the object three-dimensional enhancement unit 745.

Meanwhile, the signal processing device 170 of the present invention may apply the same algorithm or similar algorithms to image quality processing plurality of times, thereby enabled to gradually enhance an image quality.

To this end, the image quality processing unit 635 of the signal processing device 170 of the present invention may perform image quality processing by applying the same algorithm or similar algorithms two or more times.

Meanwhile, the same algorithm or the similar algorithms implemented by the image quality processing unit 635 have a different purpose to achieve in each stage. In addition, since image quality processing is performed gradually in a plurality of stages, there is an advantageous effect to cause a less number of artifacts to appear in an image, resulting in a more natural and more vivid image processing result.

Meanwhile, the same algorithm or the similar algorithms are applied plurality of times alternately with a different image quality algorithm, thereby bringing an effect more than simple continuous processing.

Meanwhile, the signal processing device 170 of the present invention may perform noise reduction processing in a plurality of stages. Each stage of noise reduction processing may include temporal processing and spatial processing.

Meanwhile, in order to calculate original quality of an image signal, the present invention uses the state-of-the-art technology such as artificial intelligence (AI). To this end, a Deep Neural Network (DNN) may be used.

The quality calculator 632 may calculate a resolution and a noise level of an input image signal using the DNN.

The quality calculator 632 or the quality calculator 670 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has few number of layers.

For example, the quality calculator 632 may analyze only some regions (e.g., 224×224, 128×128, 64×64, etc.) in an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing such as Fast Fourier Transform (FFT) on a detection region.

Figure 9A:
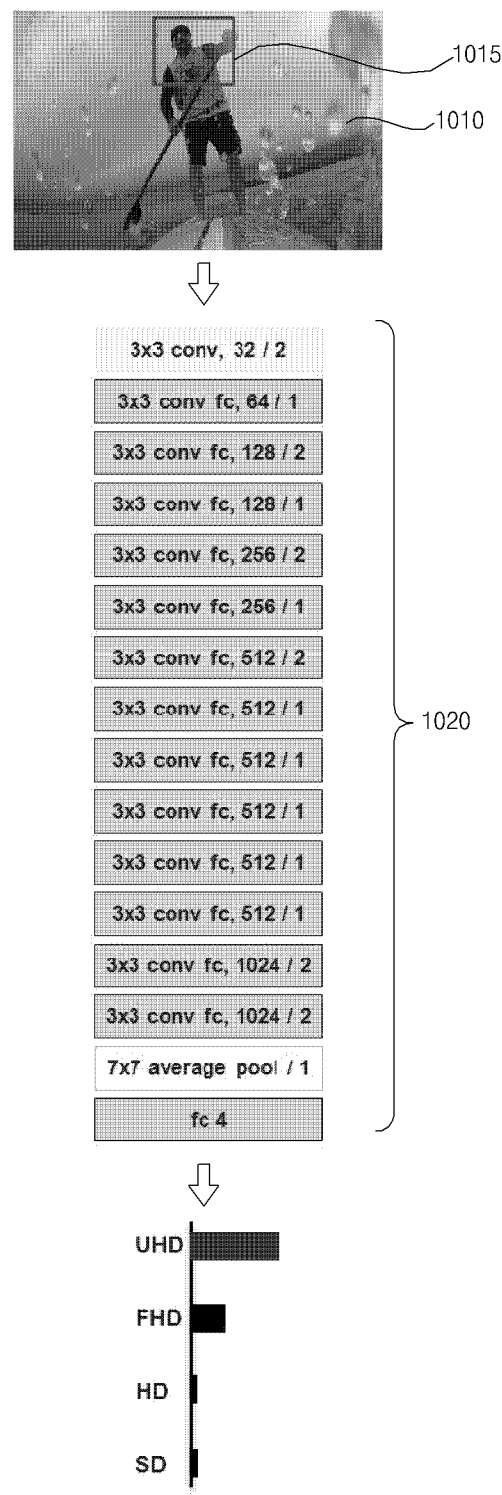

FIG. 9A is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Meanwhile, according to the CNN scheme shown in FIG. 9A, information on the particular region 1015 may be used to determine types of pixels in the region 1015.

FIG. 9B is a diagram showing calculation based on Mobile-Net.

According to the scheme shown in the drawing, quality calculation is performed.

Meanwhile, the signal processing unit 170 of the present invention may apply, as original quality changes, an image quality setting corresponding to the changed quality in real time.

In particular, in the case of changing an image quality setting, the signal processing unit 170 may apply the change of the image quality setting without any condition such as a channel change or an input change while an image is reproduced.

In this case, "real time" refers to employing a temporal processing technique including imaging infrared (IIR) and step movement.

Figure 10:
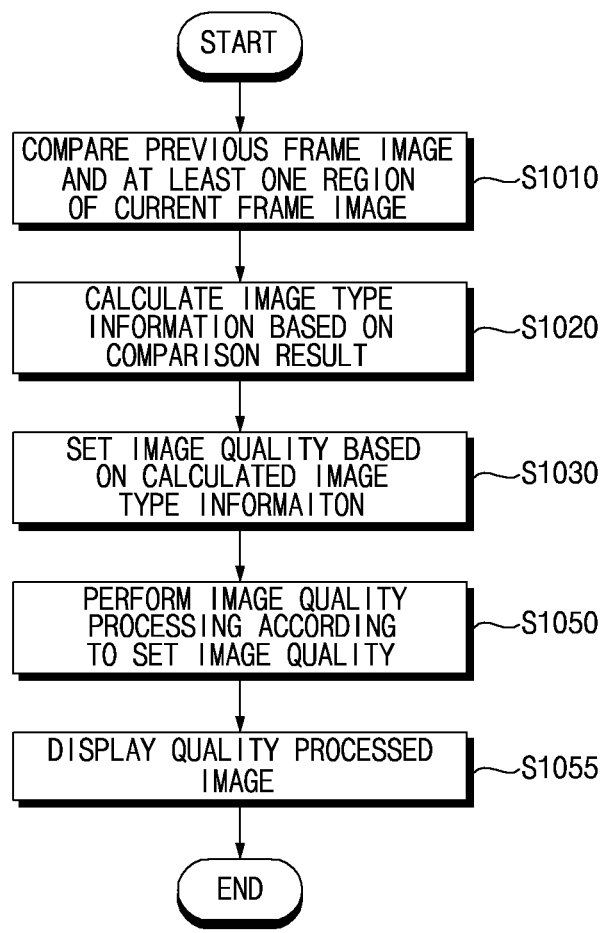
FIG. 10 is a flowchart showing a method of operating a signal processing device according to an embodiment of the present invention.

FIG. 10 is a flowchart showing a method of operating a signal processing device according to an embodiment of the present invention.

Referring to the drawing, the quality calculator 632 in the signal processing unit 170 compares at least one region of a current frame image with a previous frame image (S1010).

In addition, the quality calculator 632 in the signal processing device 170 calculates image type information based on a comparison result (S1020).

In this case, the quality calculator 632 in the signal processing device 170 may calculate a resolution and a noise level of an input image signal using a Deep Neural Network (DNN), and calculate the image type information in consideration of the calculated resolution and the calculated noise level.

The image type information may include resolution information, and image quality information related to a noise level.

For example, the image type information may be classified into normal quality information of 2K resolution, poor quality information of 2K resolution, normal quality information of 4K resolution, poor quality information of 4K resolution, or the like.

The quality calculator 632 in the signal processing device 170 may calculate probabilities for a plurality of image types based on a result of comparison between a previous frame image and a current frame image, and output probability information.

For example, the quality calculator 632 in the signal processing device 170 may calculate and output first probability information corresponding to normal quality information of 2K resolution, second probability information corresponding to poor quality information of 2K resolution, third probability information corresponding to normal quality information of 4K resolution, and fourth probability information corresponding to poor quality information of 4K resolution.

Next, the image quality setting unit 634 in the signal processing device 170 may set an image quality based on the calculated image type information (S1030).

Meanwhile, the image quality setting unit 634 may set an image quality based on probability information on a plurality of image types from the quality calculator 632.

Alternatively, the image setting unit 634 may determine one image type based on probability information for a plurality of image types, and set an image quality corresponding to the determined image type.

Meanwhile, the image quality setting unit 634 may output a noise reduction setting value or a sharpness setting value according to a set image quality.

Next, the image quality processing unit 635 may perform image quality processing according to the set image quality (S1050). The image quality processing unit 635 may perform an operation corresponding to the description provided above with reference to FIG. 8.

Next, the display 180 may display an image quality-processed image according to the set image quality (S1055). Accordingly, it is possible to improve accuracy of image analysis and display an image on which image quality processing for the improved accuracy of image analysis has been performed.

Figure 11:
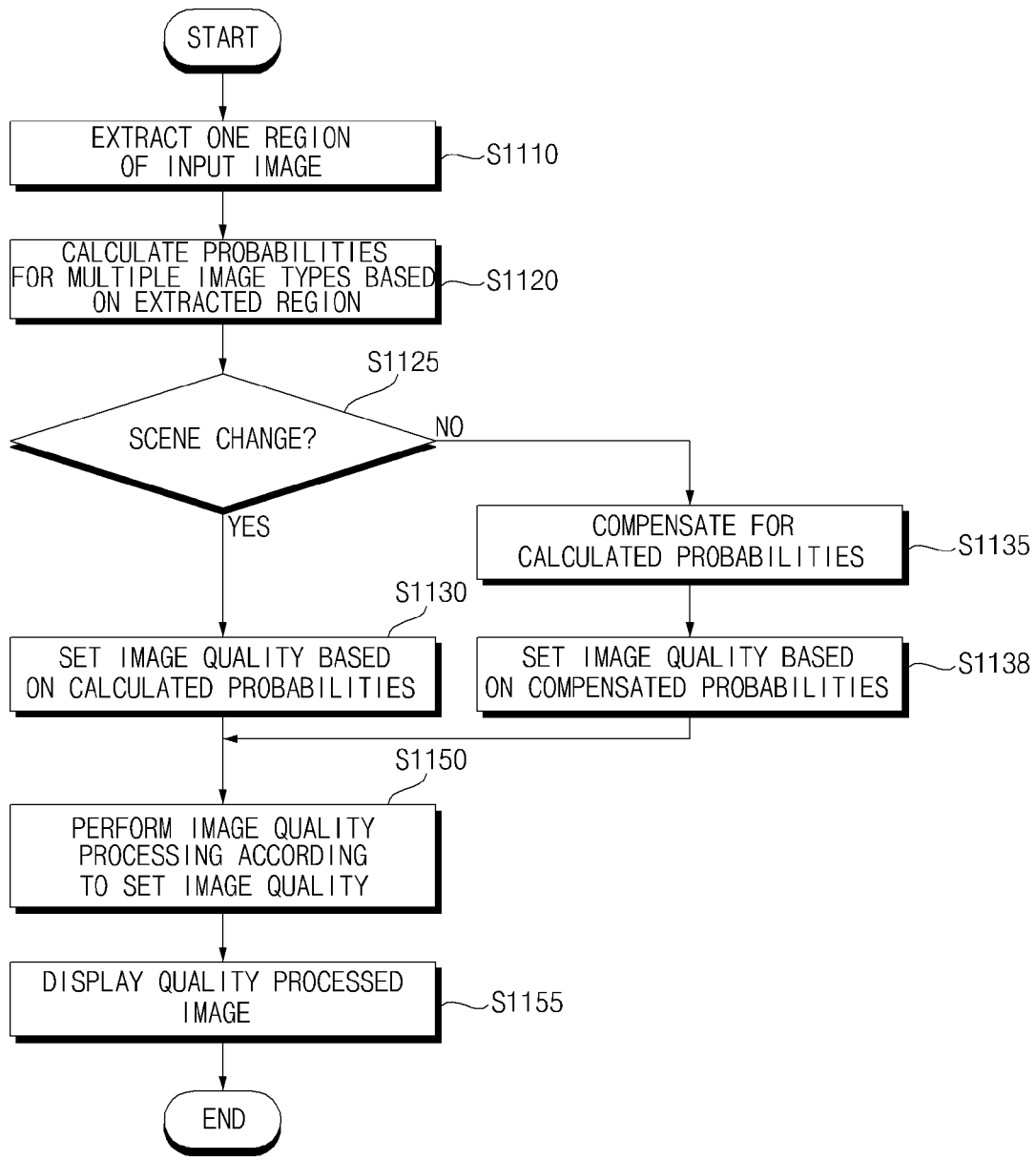
FIG. 11 is a flowchart showing a method of operating a signal processing device according to another embodiment of the present invention.

FIG. 11 is a flowchart showing a method of operating a signal processing device according to another embodiment of the present invention.

Referring to the drawing, the quality calculator 632 in the signal processing device 170 extracts a region from an input image (S1110).

Next, the quality calculator 632 compares a region extracted from a previous frame image and a region extracted from a current frame image.

In addition, the quality calculator 632 in the signal processing device 170 may calculate probabilities for a plurality of image types based on a result of the comparison (S1120).

At this point, the quality calculator 632 in the signal processing device 170 may calculate a resolution and a noise level of an input image signal using a Deep Neural Network (DNN), and calculate probabilities for a plurality of image types in consideration of the calculated resolution and the calculated noise level.

The information on the plurality of image types may include information on a plurality of resolutions, and image quality information related to a noise level.

For example, the information on the plurality of image types may be classified into normal quality information of 2K resolution, poor quality information of 2K resolution, normal quality information of 4K resolution, poor quality information of 4K resolution, or the like.

The quality calculator 632 in the signal processing device 170 may calculate probabilities for a plurality of image types based on a result of comparison between the previous frame image and the current frame image, and output probability information.

For example, the quality calculator 632 in the signal processing device 170 may calculate and output first probability information corresponding to normal quality information of 2K resolution, second probability information corresponding to poor quality information of 2K resolution, third probability information corresponding to normal quality information of 4K resolution, and fourth probability information corresponding to poor quality information of 4K resolution.

Next, the quality calculator 632 in the signal processing device 170 may determine whether a scene change occurs in the current frame image (S1125). If the scene change occurs, the image quality setting unit 634 may perform image quality setting based on the calculated probabilities for a plurality of image types, without correcting the calculated probabilities (S1130).

In addition, the image quality processing unit 635 may perform image quality processing according to a set image quality (S1150). The image quality processing unit 635 may perform an operation corresponding to the description described above with reference to FIG. 8.

Next, the display 180 may display an image quality-processed image according to the set image quality (S1155). Accordingly, it is possible to improve accuracy of image analysis and display an image on which image quality processing for the improved accuracy of image analysis has been performed.

In particular, if the current frame image is an I-th frame image that is not related to the previous frame image at all, it is preferable to change image quality and perform image quality processing without a need to refer to probability information calculated for the previous frame image.

Meanwhile, if no scene change occurs in the step of S1125, the quality calculator 632 in the signal processing device 170 may compensate for the calculated probabilities for a plurality of image types (S1135).

For example, probability information calculated for the current frame image may be compensated for based on probability information calculated for the previous frame image.

Specifically, the quality calculator 632 in the signal processing device 170 may filter the probability information calculated for the current frame image based on the probability information calculated for the previous frame image. For example, the quality calculator 632 may perform low pass filtering.

Accordingly, it is possible to compensate for the probability information calculated for the current frame image, and, if a quality of the current frame image varies greatly, image quality processing is not performed not in response to the greatly varied quality, but based on filtered probability information, and therefore, it is possible to reduce flicker caused by the greatly varied quality.

Meanwhile, the image quality setting unit 634 may perform image quality setting based on the compensated or filtered probability information for the plurality of image types (S1138).

For example, if a quality of the previous frame image is a first image quality and a quality of the current frame is a second image quality lower than the first image quality, the image quality setting unit 634 may perform image quality setting corresponding not to the second image quality but to the first image quality. Accordingly, despite a change in the image quality, it is possible to maintain the image quality intact or vary the image quality smoothly, thereby reducing flicker that can be caused due to a great variation of the image quality.

Meanwhile, if a scene change occur in the current frame image, the image quality setting unit 634 may perform image quality setting corresponding to the second image quality. Accordingly, it is possible to perform image quality processing in response to the scene change.

Next, if a scene change occurs in the current frame image, the image quality setting unit 634 may perform image quality setting corresponding to the second image quality. Accordingly, it is possible to perform image quality processing in response to the scene change. It is possible to display an image quality-processed image according to the determined quality (S1155). Accordingly, it is possible to improve accuracy of image analysis and display an image on which image quality processing for the improved accuracy of image analysis has been performed.

Figure 12:
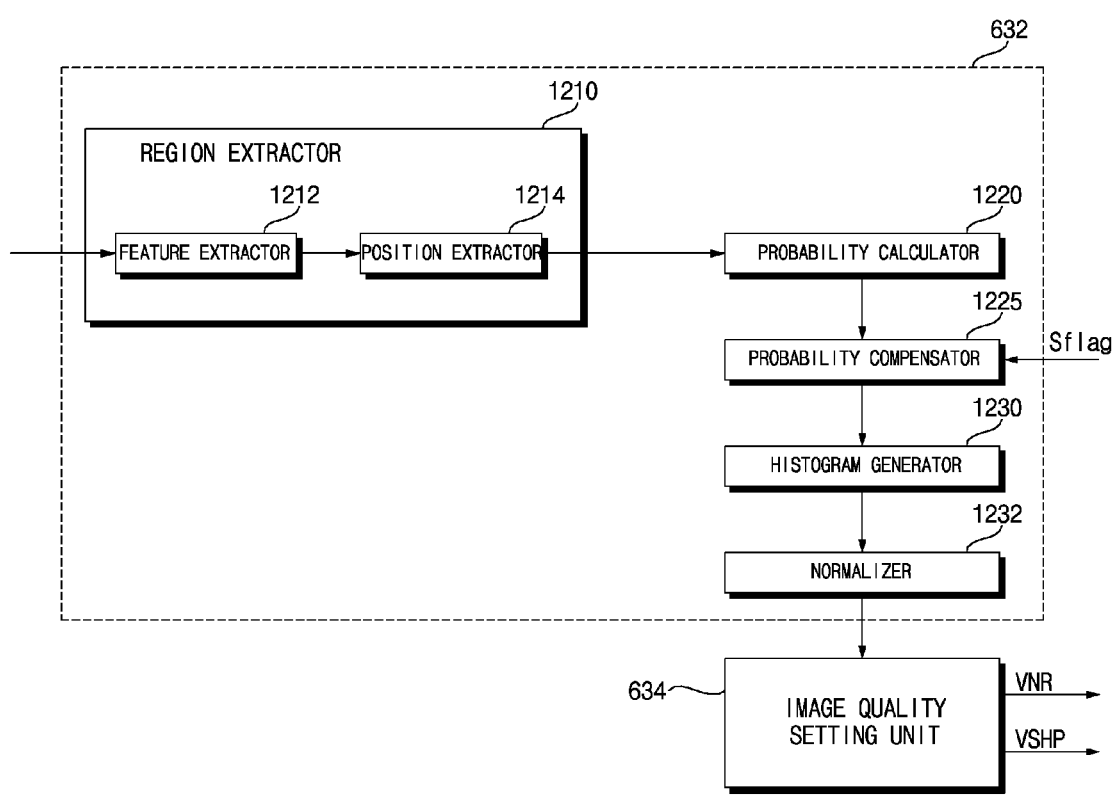
FIGS. 12 to 14C are diagrams referred to in the description of operations shown in FIG. 10 or FIG. 11.

FIG. 12 is an example of an internal block diagram of the quality calculator in FIG. 7.

Referring to the drawing, the quality calculator 632 in the signal processing device 170 may include a region extractor 1210 for contracting a region in an input image, a probability calculator 1220 for analyzing the extracted region through learning to output probabilities for a plurality of image types, and a probability compensator 1225 for compensating for the calculated probabilities.

Meanwhile, the image quality setting unit 634 in the signal processing device 170 may further include a histogram generator 1230 configured to generate a histogram based on a probability output from the probability compensator 1225, and a normalizer 1232 configured to perform normalization based on an output from the histogram generator 1230.

If an entire image is analyzed using a Deep Neural Network (DNN), it takes a considerable period of time.

Thus, the region extractor 1210 may extract only a particular region from an input image.

To this end, the region extractor 1210 may include a feature extractor 1212 configured to extract a feature of the input image, and a position extractor 1214 configured to extract a position of the extracted region.

Meanwhile, using the DNN, the probability calculator 1220 may calculate an image source quality for the region extracted by the region extractor 1210.

That is, using the DNN, the probability calculator 1220 may calculate probabilities for a plurality of image types for the region extracted by the region extractor 1210.

At this point, the probability calculator 1220 may compare a previous frame image and at least one region of a current frame image by use of the DNN, and calculate probabilities for a plurality of image types based on a result of the comparison.

For example, the probability calculator 1220 may calculate and output first probability information corresponding to normal quality information of 2K resolution, second probability information corresponding to poor quality information of 2K resolution, third probability information corresponding to normal quality information of 4K resolution, and fourth probability information corresponding to poor quality information of 4K resolution.

Figure 14A:

FIG. 14A shows an example in which a result of quality calculation for an input image is that the first probability information corresponding to the normal quality information of 2K resolution is 0.2, the second probability information corresponding to the poor quality information of 2K resolution is 0.7, the third probability information corresponding to the normal quality information of 4K resolution is 0.075, and the fourth probability information corresponding to the poor quality information of 4K resolution is 0.025.

Next, the probability compensator 1225 may compensate for a probability calculated by the probability calculator 1220.

For example, the probability compensator 1225 may compensate for probability information calculated for the current frame image, based on probability information calculated for the previous frame image.

Specifically, the probability compensator 1225 may filter the probability information calculated for the current frame image, based on the probability information calculated for the previous frame image. For example, the probability compensator 1225 may perform flow pass filtering.

Figure 13:
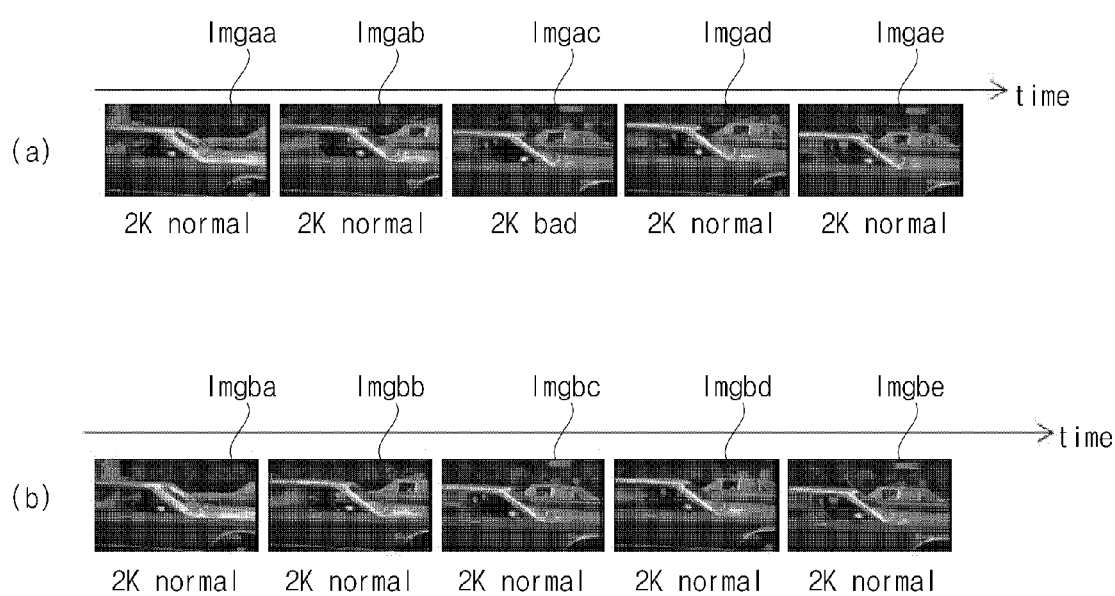

FIG. 13 (a) shows an example in which frame images Imgaa to Imgae are received sequentially.

Referring to the drawing, a normal quality image Imgaa of 2K, a normal quality image Imgab of 2K, a poor quality image Imgac of 2K, a normal quality image Imgad of 2K, and a normal quality image Imgae of 2K may be received sequentially.

In particular, if the poor quality image Imgac of 2K is received instantly and image quality processing is performed in response to the poor quality image Imgac of 2K, a user may perceive flicker on the image due to the great change in the poor quality image Imgac of 2K compared to the previous and subsequent images thereof.

Accordingly, in the present invention, it is possible to filter probability information calculated for the current frame image, based on probability information calculated for the previous frame image.

Accordingly, it is possible to compensate for the probability information calculated for the current frame image, and, if a quality of the current frame image varies greatly, image quality processing is performed in response to the greatly varied quality, but based on the filtered probability information, thereby reducing flicker that can be caused due to the great variation of image quality.

In FIG. 13, (b) shows an example in which image quality processing is performed on frame images Imgba to Imgbe.

Referring to the drawing, if the frame images Imgaa to Imgae in FIG. 13(a) are received sequentially, the image quality processing unit 635 may sequentially perform image quality processing in response to a normal quality image Imgba of 2K, a normal quality image Imgbb of 2K, a normal quality image Imgbc of 2K, a normal quality image Imgbd of 2K, and a normal quality image Imgbe of 2K according to a quality setting determined by the image quality setting unit 634.

In particular, even though the poor quality image Imgac of 2K is received instantly, image quality setting corresponding to the normal quality image Imgbc of 2K may be performed, and image quality processing may be performed according to a set image quality. Accordingly, image quality processing is performed similarly or identically to images before and after the poor quality image Imgac of 2K, and therefore a user may be prevented from perceiving flicker on the image.

Meanwhile, if a scene change occurs, the probability compensator 1225 may receive a scene change flag Sflag from the image analyzer or the like.

If a scene change occurs in the current frame image, the probability compensator 1225 may output the probability information for the plurality of image types calculated by the probability calculator 1220, without correcting the probability information.

For example, if the poor quality image Imgac of 2 k in FIG. 13(a) is received instantly and the corresponding image is a scene change image just like the I-th frame image not related to the previous or subsequent frame image thereof, it is preferable that probability calculation is not performed in order to implement the scene change.

Meanwhile, the histogram generator 1230 may generate a histogram based on probabilities output from the probability compensator 1225.

Figure 14B:
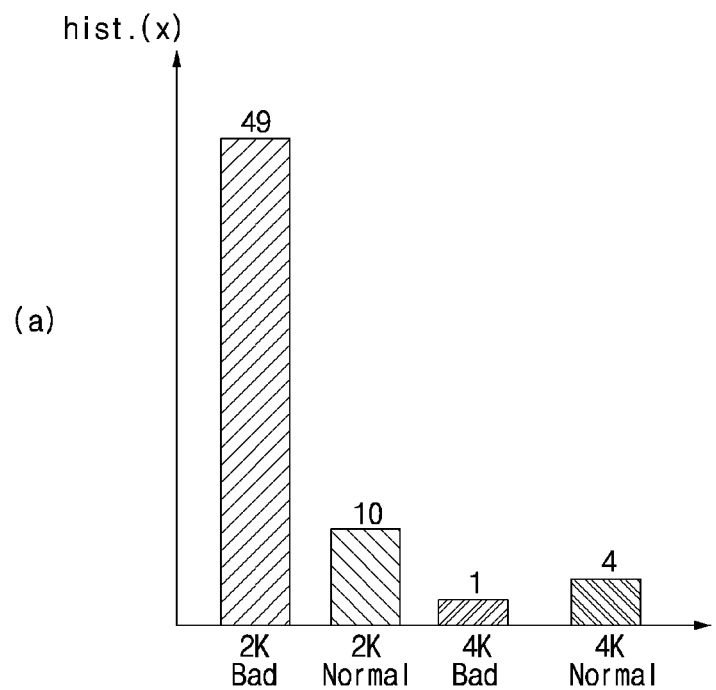
Figure 14B:
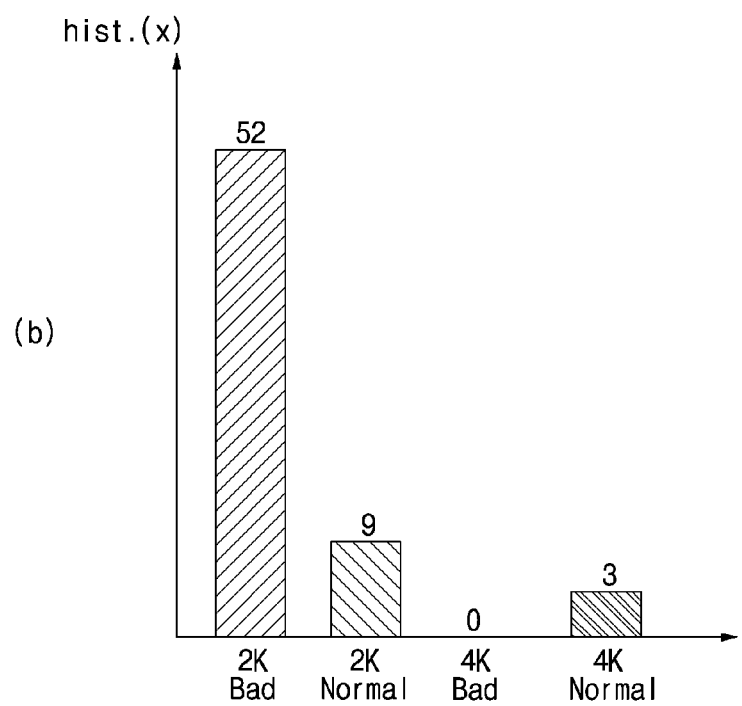

FIG. 14B (a) shows an exemplary histogram before probability compensation, and FIG. 14B (b) shows an exemplary histogram after probability compensation.

Referring to FIG. 14B (a), there is illustrated an example in which first probability information corresponding to normal quality information of 2K resolution is 10/64, second probability information corresponding to poor quality information of 2K resolution is 49/64, third probability information corresponding to normal quality information of 4K resolution is 4/64, and fourth probability information corresponding to poor quality information of 4K resolution is 1/64.

Next, referring to FIG. 14B (b), there is illustrated an example in which first probability information corresponding to normal quality information of 2K resolution is 9/64, second probability information corresponding to poor quality information of 2K resolution is 52/60, third probability information corresponding to normal quality information of 4K resolution is 3/64, and fourth probability information corresponding to poor quality information of 4K resolution is 0/64.

In comparison between FIG. 14B (a) and FIG. 14B (b), the second probability information corresponding to the poor quality information of 2K increases from 49/60 to 52/64.

That is, due to probability compensation referring to a previous frame image or the like, accuracy of image analysis may further improve.

Next, the normalizer 1232 may perform normalization based on an output from the histogram generator 1230.

For example, the normalizer 1232 may perform normalization in consideration of an image resolution, normalization in consideration of image noise, etc.

The information for a plurality of image types calculated by the quality calculator 632 in FIG. 12 may be eventually input to the image quality setting unit 634.

Then, the image quality setting unit 634 may set an image quality based on the calculated information for the plurality of image types. Accordingly, it is possible to improve accuracy of image analysis and perform image quality processing according thereto.

Meanwhile, the image quality setting unit 634 may set an image quality based on probability information for a plurality of image types calculated by the quality calculator 632.

Figure 14C:
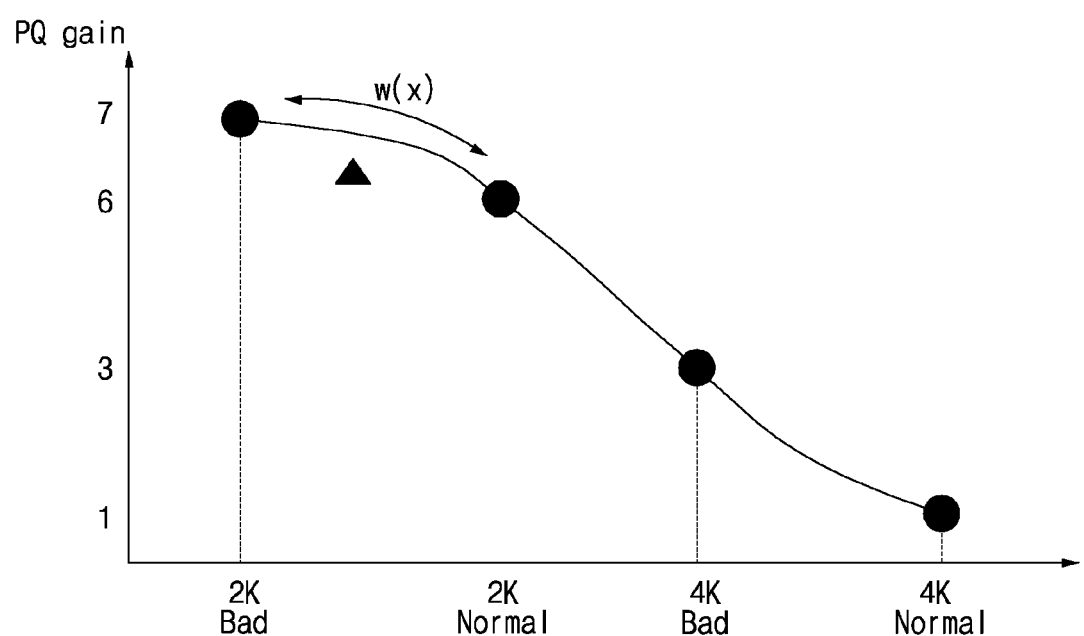

FIG. 14C shows examples of a first image quality setting value corresponding to normal quality information of 2K resolution, a second image quality setting value corresponding poor quality information of 2K resolution, a third quality setting value corresponding to normal quality information of 4K resolution, and a fourth quality setting value corresponding to poor quality information of 4K resolution.

Accordingly, it is possible to improve accuracy of image analysis and perform image quality processing according thereto.

Meanwhile, the image quality setting unit 634 may determine any one image type based on probability information for a plurality of image types calculated by the quality calculator 632, and set an image quality corresponding to the determined image type. Accordingly, it is possible to improve accuracy of image analysis and perform image quality processing according thereto.

Meanwhile, the image quality setting unit 634 may output a noise reduction value (VNR) or a sharpness setting value (VSHP) according to the set image quality. Accordingly, it is possible to perform image quality processing in response to the image type.

Meanwhile, if a quality of the previous frame image is a first image quality and a quality of the current frame is a second image quality lower than the first image quality, the image quality setting unit 634 may perform image quality setting corresponding not to the second image quality but to the first image quality. Accordingly, despite a change in the image quality, it is possible to maintain the image quality intact or vary the image quality smoothly, thereby reducing flicker that can be caused due to a great variation of the image quality.

At this point, if a scene change occurs in the current frame image, the image quality setting unit 634 may perform image quality setting corresponding to the second image quality. Accordingly, it is possible to perform image quality processing in response to the scene change.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed is:

1. A signal processing device of an image display apparatus, the signal processing device comprising:
one or more processors configured to:
compare a previous frame image from an image signal and at least one region of a current frame image from the image signal;
determine image type information of the image signal based on a result of the comparison;
set an image quality of the image signal based on the determined image type information; and
perform image quality processing on the image signal according to the set image quality, wherein the image quality is set corresponding to a first image quality and the image quality is set corresponding to a second image quality based at least in part on a scene change occurring in the current frame image and a change in the image type information for the current frame image.

2. The signal processing device of claim 1, wherein the one or more processors are further configured to: determine probabilities for a plurality of image types based on the result of the comparison, and output probability information for the plurality of image types, and
wherein the image quality of the image signal is set based on the outputted probability information.

3. The signal processing device of claim 2, wherein the one or more processors are further configured to determine any one image type based on the outputted probability information, wherein the image quality of the image signal is set based on the determined image type.

4. The signal processing device of claim 1, wherein the one or more processors are further configured to: analyze the previous frame image and at least a region of the current frame image by utilizing a deep neural network, and determine probabilities for a plurality of image types based on the analyzed previous frame image and the at least the region of the current frame image.

5. The signal processing device of claim 1, wherein the one or more processors are further configured to output a noise reduction setting value or a sharpness setting value according to the set image quality.

6. The signal processing device of claim 1, wherein the determined image type information comprises resolution information and image quality information.

7. The signal processing device of claim 1, wherein the image quality setting is set corresponding to a first image quality when an image quality of the previous frame image is the first image quality and an image quality of the current frame image is a second image quality lower than the first image quality.

8. A signal processing device of an image display apparatus, the signal processing device comprising:
one or more processors configured to:
extract at least one region of a previous frame image from an image signal and at least one region of a current frame image from the image signal and determine probabilities for a plurality of image types based on a result of comparing the extracted regions;
set an image quality of the image signal based on the determined probabilities; and
perform image quality processing on the image signal according to the set image quality, wherein the image quality is set corresponding to a second image quality based at least in part on a scene change occurring in the current frame image.

9. The signal processing device of claim 8, wherein the one or more processors are further configured to:
determine whether a scene change occurs in the current frame image, output the determined probabilities for the plurality of image types upon a determination that the scene change occurs in the current frame image, and output a filtered probability using a probability determined for the previous frame image upon a determination that the scene change does not occur in the current frame image.

10. The signal processing device of claim 9, wherein the image quality of the image signal is set based on the outputted determined probabilities upon a determination that the scene change occurs in the current frame image or the outputted filtered probability upon a determination that the scene change does not occur in the current frame image.

11. The signal processing device of claim 8, wherein the one or more processors are further configured to:
extract a region of an input image;
analyze the extracted region by utilizing a deep neural network to output probabilities for a plurality of image types; and
compensate for the outputted probabilities.

12. The signal processing device of claim 11, wherein the one or more processors are further configured to output a filtered probability using a probability for the previous frame image and a probability for the current frame image.

13. The signal processing device of claim 11, wherein the one or more processors are further configured to output the determined probabilities without performing probability compensation when a scene change occurs in the current frame image.

14. The signal processing device of claim 11, wherein the one or more processors are further configured to:
generate a histogram based on the compensated probabilities; and
perform normalization based on the histogram.

15. The signal processing device of claim 8, wherein the one or more processors are further configured to output a noise reduction setting value or a sharpness setting value according to the set image quality.

16. The signal processing device of claim 8, wherein information on the plurality of image types comprises resolution information and image quality information.

17. A method comprising:
comparing a previous frame image from an image signal and at least one region of a current frame image from the image signal;
determining image type information of the image signal based on a result of the comparison;
setting an image quality of the image signal based on the determined image type information; and
performing image quality processing on the image signal according to the set image quality,
keep performing the image quality setting corresponding to a first image quality based at least in part on the determined image type information for the current frame image changing while image quality setting corresponding to the first image quality is performed, and
performing the image quality setting corresponding to a second image quality based at least in part on a scene change occurring in the current frame image and the image type information for the current frame changing.

18. The method of claim 17, further comprising determining probabilities for a plurality of image types based on the result of the comparison and outputting probability information for the plurality of image types, and
wherein the image quality of the image signal is set based on the outputted probability information.

* * * * *